United States Patent
Nagai

(10) Patent No.: US 9,882,207 B2
(45) Date of Patent: Jan. 30, 2018

(54) LITHIUM-ION SECONDARY BATTERY

(75) Inventor: Hiroki Nagai, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 59 days.

(21) Appl. No.: 14/388,894

(22) PCT Filed: Mar. 30, 2012

(86) PCT No.: PCT/JP2012/058664
§ 371 (c)(1),
(2), (4) Date: Nov. 21, 2014

(87) PCT Pub. No.: WO2013/145290
PCT Pub. Date: Oct. 3, 2013

(65) Prior Publication Data
US 2015/0072232 A1    Mar. 12, 2015

(51) Int. Cl.
*H01M 4/131* (2010.01)
*H01M 4/36* (2006.01)
(Continued)

(52) U.S. Cl.
CPC ......... *H01M 4/366* (2013.01); *H01M 4/0471* (2013.01); *H01M 4/131* (2013.01); *H01M 4/133* (2013.01); *H01M 4/485* (2013.01); *H01M 4/505* (2013.01); *H01M 4/525* (2013.01); *H01M 4/624* (2013.01); *H01M 10/0525* (2013.01);
(Continued)

(58) Field of Classification Search
CPC .... H01M 4/131; H01M 4/1391; H01M 4/366; H01M 4/624; H01M 4/0471; H01M 4/485; H01M 10/0587; H01M 4/133; H01M 10/0525; H01M 4/525; H01M 4/505;
(Continued)

(56) References Cited

U.S. PATENT DOCUMENTS 5,702,845 A  * 12/1997  Kawakami ............ H01M 4/134
                                                           429/209
6,040,090 A  *  3/2000  Sunagawa ............. H01M 4/131
                                                           429/223
(Continued)

FOREIGN PATENT DOCUMENTS

JP      2008-218248        9/2008
JP      2011-119092 A      6/2011
(Continued)

OTHER PUBLICATIONS

English machine translation of Toya JP4894969, dated Mar. 14, 2012.*

*Primary Examiner* — Lisa S Park
(74) *Attorney, Agent, or Firm* — Finnegan, Henderson, Farabow, Garrett & Dunner, LLP

(57) ABSTRACT

In a lithium-ion secondary battery (100), positive electrode active material particles (610) each include a shell portion (612) made of a layered lithium-transition metal oxide, a hollow portion (614) formed inside the shell portion (612), and a through-hole (616) penetrating through the shell portion (612). A positive electrode active material layer (223) has a density A of $1.80\ g/cm^3 \leq A \leq 2.35\ g/cm^3$, and a negative electrode active material layer (243) has a density B of $0.95\ g/cm^3 \leq B \leq 1.25\ g/cm^3$.

13 Claims, 17 Drawing Sheets

(51) Int. Cl.

| | | |
|---|---|---|
| *H01M 4/505* | (2010.01) | |
| *H01M 4/525* | (2010.01) | |
| *H01M 10/0525* | (2010.01) | |
| *H01M 4/133* | (2010.01) | |
| *H01M 10/0587* | (2010.01) | |
| *H01M 4/04* | (2006.01) | |
| *H01M 4/485* | (2010.01) | |
| *H01M 4/62* | (2006.01) | |
| *H01M 4/587* | (2010.01) | |
| *H01M 2/22* | (2006.01) | |
| *H01M 2/26* | (2006.01) | |
| *H01M 4/02* | (2006.01) | |

(52) U.S. Cl.
CPC .......... *H01M 10/0587* (2013.01); *H01M 2/22* (2013.01); *H01M 2/263* (2013.01); *H01M 4/587* (2013.01); *H01M 2004/021* (2013.01); *H01M 2004/028* (2013.01); *H01M 2220/20* (2013.01); *Y02E 60/122* (2013.01); *Y02P 70/54* (2015.11); *Y02T 10/7011* (2013.01)

(58) Field of Classification Search
CPC .. H01M 2004/028; H01M 2/22; H01M 2/263; Y02E 60/122; Y02P 70/54
See application file for complete search history.

(56) References Cited

U.S. PATENT DOCUMENTS

| | | | |
|---|---|---|---|
| 2003/0054248 A1* | 3/2003 | Noda | H01M 4/131 429/224 |
| 2008/0193841 A1* | 8/2008 | Sun | C01G 45/1242 429/220 |
| 2009/0104517 A1* | 4/2009 | Yuasa | H01M 4/505 429/158 |
| 2010/0112443 A1* | 5/2010 | Blomgren | H01M 4/1391 429/221 |
| 2011/0206988 A1 | 8/2011 | Tanaka et al. | |
| 2011/0217594 A1* | 9/2011 | Awano | H01M 4/131 429/232 |
| 2012/0282525 A1 | 11/2012 | Nagai et al. | |
| 2012/0321947 A1 | 12/2012 | Goto et al. | |
| 2013/0108921 A1 | 5/2013 | Kase et al. | |
| 2013/0288121 A1 | 10/2013 | Nagai et al. | |

FOREIGN PATENT DOCUMENTS

| | | |
|---|---|---|
| JP | 2011-175933 | 9/2011 |
| JP | 2012-252807 | 12/2012 |
| WO | WO 2011/036759 A1 | 3/2011 |
| WO | WO 2011/122448 A1 | 10/2011 |
| WO | WO 2012/063370 A1 | 5/2012 |

* cited by examiner

LITHIUM-ION SECONDARY BATTERY

CROSS-REFERENCE TO RELATED APPLICATIONS

This application is a national phase application of International Application No. PCT/JP2012/058664, filed Mar. 30, 2012, the content of which is incorporated herein by reference.

TECHNICAL FIELD

The present invention relates to lithium-ion secondary batteries. In the present description, the term "lithium ion secondary battery" refers to a secondary battery that uses lithium ions as electrolyte ions and implements charging and discharging by electron transfer between positive and negative electrodes associated with lithium ions. In the present description, the term "secondary battery" is meant to include rechargeable electrical storage devices in general.

BACKGROUND ART

A lithium-ion secondary battery is disclosed in, for example, JP 2008-218248 A. The publication mentions the density of a negative electrode mixture containing a carbon material. More specifically, the publication proposes a lithium-ion secondary battery in which the density of the negative electrode mixture containing a carbon material is from 1.4 g/cm$^3$ to 1.7 g/cm$^3$ and the amount of the negative electrode mixture coated on the negative electrode current collector is from 6 mg/cm$^2$ to 8 mg/cm$^2$. The publication states that such a configuration makes it possible to provide a lithium-ion secondary battery with improved load characteristics and improved input-output characteristics.

CITATION LIST

Patent Literature

Patent Literature 1: JP 2008-218248 A

SUMMARY OF INVENTION

Technical Problem

Vehicles that drive the wheels with electric motors, such as hybrid electric vehicles (including plug-in hybrid vehicles) and electric vehicles, are capable of running by the electric power stored in batteries only. The batteries tend to show a lower output power as the charge level decreases. In order to stabilize the running, it is desirable to use the batteries within a predetermined range of charge level. If the batteries to be incorporated in such vehicles can exhibit necessary output power even at a low charge level (i.e., even when the amount of charge is small), it is possible to improve the traveling performance of the vehicles, such as hybrid electric vehicles and electric vehicles. Moreover, if the batteries can exhibit necessary output power even at a low charge level (i.e., even when the amount of charge is small), it is possible to reduce the number of batteries necessary to obtain required amount of energy, and thus to achieve cost reduction. In addition, in such vehicle applications, it is assumed that the batteries may be used particularly in the vehicles that are left parked outdoors. For example, it is necessary to ensure that the batteries satisfy required performance in a wider range of temperature environment, from about −30° C. to about 60° C.

According to a study by the present inventor, however, a low-temperature environment at about −30° C. tends to cause a decrease in the output power, or an increase in the resistance due to high-rate cycling. On the other hand, a high temperature environment at about 60° C. tends to cause capacity degradation due to storage.

Solution to Problem

A lithium-ion secondary battery proposed by the present inventor comprises a positive electrode current collector, a positive electrode active material layer retained on the positive electrode current collector and containing positive electrode active material particles, a negative electrode current collector, and a negative electrode active material layer retained on the negative electrode current collector and containing negative electrode active material particles comprising a graphite material. The positive electrode active material particles each include a shell portion comprising a layered lithium-transition metal oxide, a hollow portion formed inside the shell portion, and a through-hole penetrating through the shell portion. The positive active material layer has a density A of 1.80 g/cm$^3$≤A≤2.35 g/cm$^3$, and the negative electrode active material layer has a density B of 0.95 g/cm$^3$≤B≤1.25 g/cm$^3$.

Particularly in a low temperature environment at about −30° C., such a lithium-ion secondary battery can keep high output power and inhibit the resistance increase after high-rate cycling. Moreover, even in a high temperature environment at about 60° C., such a lithium-ion secondary battery can minimize capacity degradation due to storage.

It is also possible that, when the thickness of the shell portion at an arbitrary position within an inner surface of the shell portion is defined by the minimum distance from the arbitrary position within the inner surface of the shell portion to an outer surface of the shell portion in an arbitrary cross section of the positive electrode active material layer, the thickness of the shell portion may be less than or equal to 3.0 μm in average of the positive electrode active material layer. It is also possible that the thickness of the shell portion may be equal to or greater than 0.1 μm. In addition, the primary particles of the lithium-transition metal oxide may have a major axis length of less than or equal to 0.8 μm in average of the positive electrode active material layer. In this case, the major axis length of the primary particles of the lithium-transition metal oxide may be equal to or greater than 0.2 μm. The through-hole may have an aperture width of from 0.01 μm to 2.0 μm in average of the positive electrode active material layer.

It is also possible that the positive electrode active material particles may have a particle void fraction of equal to or greater than 15% in average of the positive electrode active material layer.

The lithium-transition metal oxide may contain at least one metal element selected from the group consisting of Ni, Co, and Mn. It is also possible that the lithium-transition metal oxide may contain Ni, Co, and Mn. It is also possible that the lithium-transition metal oxide may be $Li_{1+x}Ni_yCo_zMn_{(1-y-z)}M_\gamma O_2$. In the formula, 0≤x≤0.2, 0.1<y<0.9, 0.1<z<0.4, and 0≤γ≤0.03. M is at least one additive selected from the group consisting of Zr, W, Mg, Ca, Na, Fe, Cr, Zn, Si, Sn, Al, B, and F. In this case, it is possible that the lithium-transition metal oxide may contain W, and the W content $m_{MA}$ may be from 0.05 mole % to 2 mole % when the total number $m_{MT}$ of moles of Ni, Co, and Mn is set at 100 mole % expressed in mole percentage.

It is also possible that the positive electrode active material layer may further comprise a conductive agent and PVDF in addition to the positive electrode active material particles; and the positive electrode active material particles may be contained in an amount of from 86 mass % to 94 mass %, the conductive agent may be contained in an amount of from 6 mass % to 10 mass %, and the PVDF may be contained in an amount of from 1 mass % to 4 mass %. The negative electrode active material layer may contain the negative electrode active material particles in an amount of from 97 mass % to 99 mass %.

It is desirable that the positive electrode active material particles be manufactured, for example, by a method comprising the steps of: producing a source hydroxide by supplying ammonium ions to an aqueous solution of a transition metal compound to precipitate particles of a transition metal hydroxide from the aqueous solution, the aqueous solution containing at least one of the transition metal elements constituting a lithium-transition metal oxide; mixing the transition metal hydroxide with a lithium compound to prepare an unsintered mixture; and sintering the mixture to obtain the active material particles.

Such a lithium-ion secondary battery can keep high output power and inhibit the resistance increase after high-rate cycling, particularly in a low temperature environment at about −30° C. Moreover, such a lithium-ion secondary battery can minimize capacity degradation due to storage even in a high temperature environment at about 60° C. For this reason, this lithium-ion secondary battery can be used suitably as a power supply for driving a vehicle.

DESCRIPTION OF EMBODIMENTS

Here, an example of the structure of a lithium-ion secondary battery will be described first. Then, referring to the example of the structure as appropriate, a lithium-ion secondary battery according to one embodiment of the present invention will be described. The parts and components that exhibit the same workings are denoted by the same reference symbols as appropriate. The drawings are depicted schematically and do not necessarily reflect actual objects. The drawings merely show examples, and they do not limit the invention unless otherwise stated.

Figure 1:
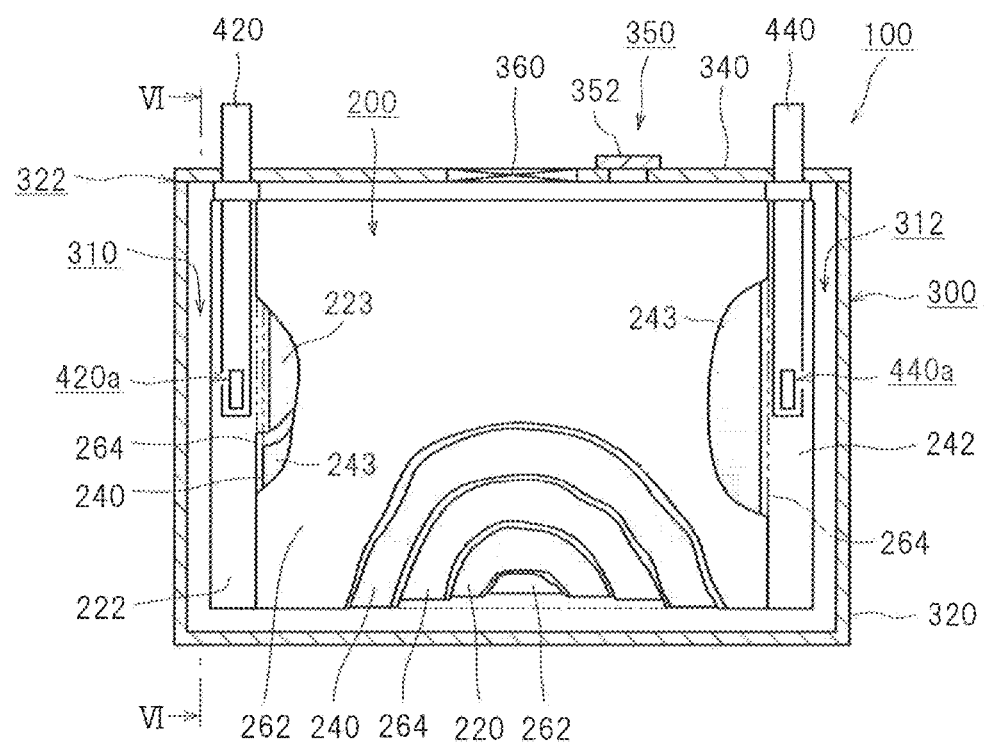
FIG. 1 is a view illustrating one example of the structure of a lithium-ion secondary battery.
Figure 2:
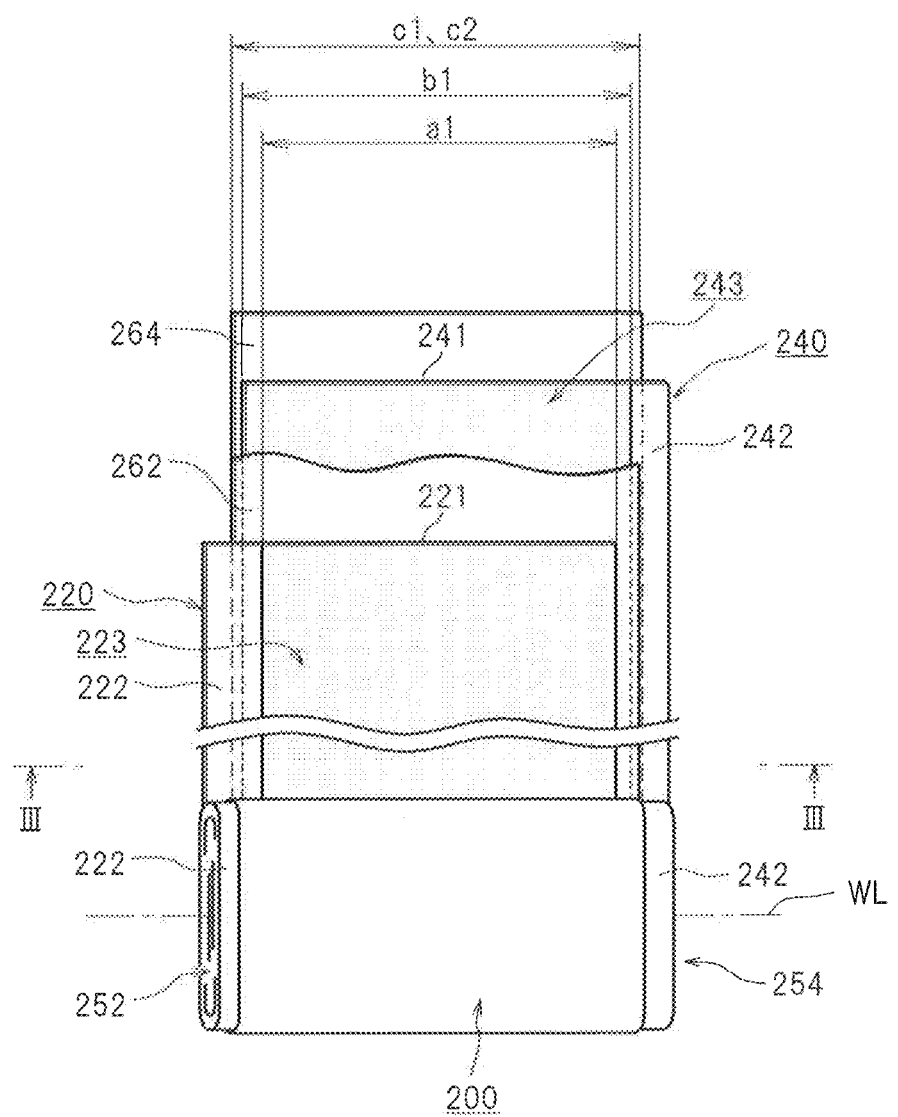
FIG. 2 is a view illustrating a wound electrode assembly of the lithium-ion secondary battery.
Figure 3:
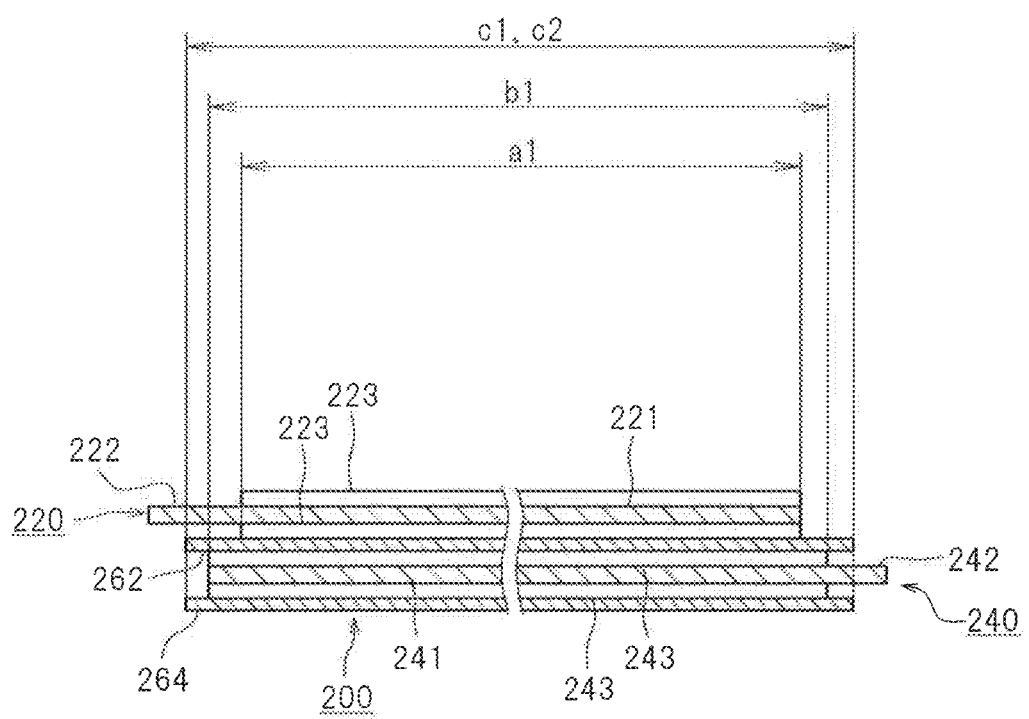
FIG. 3 is a cross-sectional view taken along line III-III in FIG. 2.

FIG. 1 illustrates a lithium-ion secondary battery 100. As illustrated in FIG. 1, the lithium-ion secondary battery 100 has a wound electrode assembly 200 and a battery case 300. FIG. 2 is a view illustrating the wound electrode assembly 200. FIG. 3 shows a cross section taken along line III-III in FIG. 2.

As illustrated in FIG. 2, the wound electrode assembly 200 has a positive electrode sheet 220, a negative electrode sheet 240, and separators 262 and 264. The positive electrode sheet 220, the negative electrode sheet 240, and the separators 262 and 264 are strip-shaped sheets.

<<Positive Electrode Sheet 220>>

The positive electrode sheet 220 has a strip-shaped positive electrode current collector 221 and a positive electrode active material layer 223. A metal foil suitable for the positive electrode may be used preferably for the positive electrode current collector 221. For the positive electrode current collector 221, it is possible to use, for example, a strip-shaped aluminum foil having a predetermined width and a thickness of about 15 μm. An uncoated portion 222 is provided along one lateral-side edge of the positive electrode current collector 221. As illustrated in FIG. 3, the positive electrode active material layer 223 is retained on both faces of the positive electrode current collector 221 except for the uncoated portion 222, which is provided in the positive electrode current collector 221, in the example shown in the figure. The positive electrode active material layer 223 contains a positive electrode active material. The positive electrode active material layer 223 is formed by coating a positive electrode mixture containing the positive electrode active material onto the positive electrode current collector 221.

<<Positive Electrode Active Material Layer 223 and Positive Electrode Active Material Particles 610>>

Figure 4:
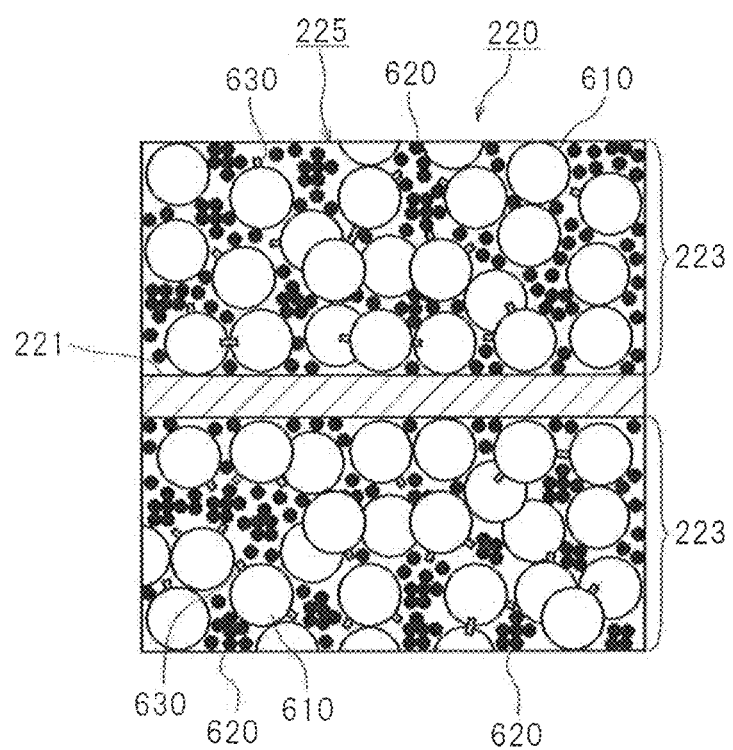
FIG. 4 is a cross-sectional view illustrating the structure of a positive electrode active material layer.

Here, FIG. 4 is a cross-sectional view of the positive electrode sheet 220. In FIG. 4, positive electrode active material particles 610, conductive agent 620, and binder 630 in the positive electrode active material layer 223 are enlarged schematically so that the structure of the positive electrode active material layer 223 can be shown clearly. As illustrated in FIG. 4, the positive electrode active material layer 223 contains the positive electrode active material particles 610, the conductive agent 620, and the binder 630.

Various types of substances that can be used as the positive electrode active material of lithium-ion secondary batteries may be used for the positive electrode active material particles 610. Examples of the substances for the positive electrode active material particles 610 include lithium-transition metal oxides, such as $LiNiCoMnO_2$ (lithium-nickel-cobalt-manganese composite oxide), $LiNiO_2$ (lithium nickel oxide), $LiCoO_2$ (lithium cobalt oxide), $LiMn_2O_4$ (lithium manganese oxide), and $LiFePO_4$ (lithium iron phosphate). Here, $LiMn_2O_4$ may have, for example, a spinel structure. $LiNiO_2$ and $LiCoO_2$ may have a layered rock-salt structure. $LiFePO_4$ may have, for example, an olivine structure. The $LiFePO_4$ with an olivine structure may include, for example, particles in the range of nanometers. The $LiFePO_4$ with an olivine structure may further be coated with a carbon film.

<<Conductive Agent 620>>

Examples of the conductive agent 620 include carbon materials, such as carbon powder and carbon fiber. It is possible to use one of the just-mentioned examples of the conductive agents either alone or in combination with another one or more of the examples. Examples of the carbon powder include various types of carbon blacks (such as acetylene black, oil-furnace black, graphitized carbon black, carbon black, graphite, and Ketjen Black) and graphite powder.

<<Binder 630>>

The binder 630 serves to bond the particles of the positive electrode active material particles 610 and the conductive agent 620 contained in the positive electrode active material layer 223 with each other, and to bond these particles with the positive electrode current collector 221. As the binder 630, it is possible to use polymers that can be dissolved or dispersed in the solvent used. For example, for the positive electrode mixture composition using an aqueous solvent, it is preferable to use water-soluble or water-dispersible polymers, including: cellulose-based polymers (such as carboxymethylcellulose (CMC) and hydroxypropyl methyl cellulose (HPMC)); fluoropolymers (such as polyvinyl alcohol (PVA), polytetrafluoroethylene (PTFE), and tetrafluoroethylene-hexafluoropropylene copolymer (FEP)); and rubber materials (such as vinyl acetate copolymer, styrene-butadiene copolymer (SBR), acrylic acid-modified SBR resin (SBR latex)). For the positive electrode mixture composition using a non-aqueous solvent, it is preferable to use polymers (such as polyvinylidene fluoride (PVDF), polyvinylidene chloride (PVDC), and polyacrylonitrile (PAN)).

<<Thickening Agent and Solvent>>

The positive electrode active material layer 223 is formed, for example, in the following manner: the positive electrode active material particles 610 and the conductive agent 620 mentioned above are mixed into a paste form (slurry form) in a solvent to prepare a positive electrode mixture, which is then coated onto the positive electrode current collector 221, dried, and pressure-rolled. In this case, either an aqueous solvent or a non-aqueous solvent can be used as the solvent for the positive electrode mixture. A preferable example of the non-aqueous solvent is N-methyl-2-pyrrolidone (NMP). The above-mentioned examples of the polymer materials used as the binder 630 can also be used for the purpose of obtaining the function as an addition agent, such as a thickening agent for the positive electrode mixture, in addition to the function as the binder.

It is preferable that the mass ratio of the positive electrode active material in the entire positive electrode mixture be about 50 wt. % or more (typically from 50 wt. % to 95 wt. %), and generally more preferably from about 70 wt. % to about 95 wt. % (e.g., from 75 wt. % to 90 wt. %). The proportion of the conductive agent in the entire positive electrode mixture may be from about 2 wt. % to about 20 wt. %, and generally preferably from about 2 wt. % to about 15 wt. %. In a composition that uses a binder, the proportion of the binder in the entire positive electrode mixture may be from about 1 wt. % to about 10 wt. %, and generally preferably from about 2 wt. % to about 5 wt. %.

<<Negative Electrode Sheet 240>>

As illustrated in FIG. 2, the negative electrode sheet 240 has a strip-shaped negative electrode current collector 241 and a negative electrode active material layer 243. A metal foil suitable for the negative electrode may be used preferably for the negative electrode current collector 241. A strip-shaped copper foil having a predetermined width and a thickness of about 10 μm is used for this negative electrode current collector 241. An uncoated portion 242 is provided along one lateral-side edge of the negative electrode current collector 241. The negative electrode active material layer 243 is formed on both faces of the negative electrode current collector 241 except for the uncoated portion 242, which is provided in the negative electrode current collector 241. The negative electrode active material layer 243 is retained by the negative electrode current collector 241, and it contains at least a negative electrode active material. In the negative electrode active material layer 243, a negative electrode mixture containing a negative electrode active material is coated on the negative electrode current collector 241.

<<Negative Electrode Active Material Layer 243>>

Figure 5:
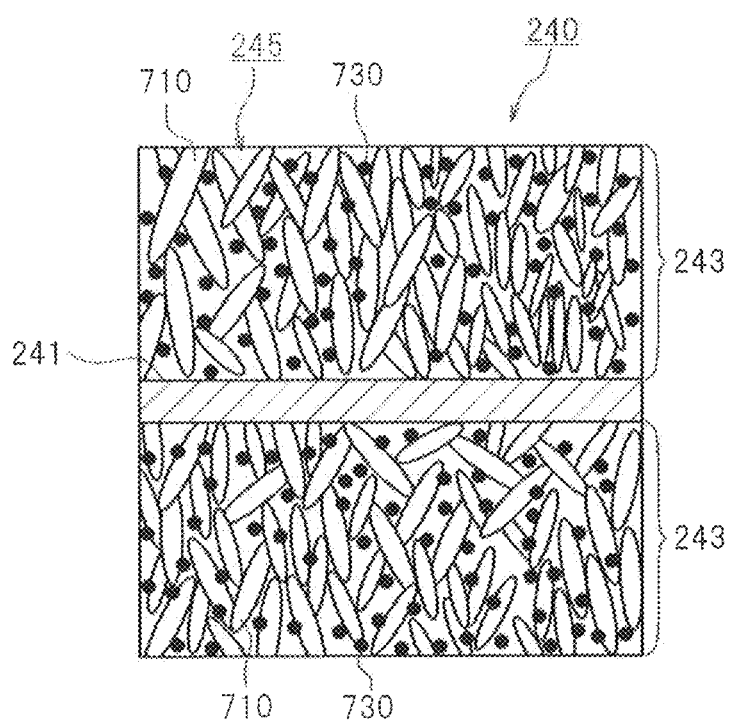
FIG. 5 is a cross-sectional view illustrating the structure of a negative electrode active material layer.

FIG. 5 is a cross-sectional view of the negative electrode sheet 240 of the lithium-ion secondary battery 100. As illustrated in FIG. 5, the negative electrode active material layer 243 contains the negative electrode active material 710, a thickening agent (not shown), a binder 730, and so forth. In FIG. 5, the negative active material 710 and the binder 730 in the negative electrode active material layer 243 are enlarged schematically so that the structure of the negative electrode active material layer 243 can be shown clearly.

<<Negative Electrode Active Material>>

As the negative electrode active material 710, it is possible to use any conventional material used for lithium-ion secondary batteries, either alone or in combination, without any particular limitation. Examples include particulate carbon materials (carbon particles) at least partially containing a graphite structure (a layered structure). More specifically, the negative electrode active material may be natural graphite, natural graphite coated with amorphous carbon material, graphitic materials (graphites), non-graphitizable carbons (hard carbons), graphitizable carbons (soft carbons), and combinations thereof. Here, the figure depicts a case in which what is called flake graphite is used as the negative electrode active material 710, but the negative electrode active material 710 is not limited to the example shown in the figure.

<<Thickening Agent and Solvent>>

The negative electrode active material layer 243 is formed, for example, in the following manner: the negative electrode active material 710 and the binder 730 mentioned above are mixed into a paste form (slurry form) in a solvent to prepare a negative electrode mixture, which is then coated onto the negative electrode current collector 241, dried, and pressure-rolled. In this case, either an aqueous solvent or a non-aqueous solvent can be used as the solvent for the negative electrode mixture. A preferable example of the non-aqueous solvent is N-methyl-2-pyrrolidone (NMP). For the binder 730, any of the polymer materials shown as the examples of the binder 630 of the above-described positive electrode active material layer 223 (see FIG. 4) may be used. The above-mentioned examples of the polymer materials used as the binder 630 of the positive electrode active material layer 223 can also be used for the purpose of obtaining the function as an addition agent, such as a thickening agent for the positive electrode mixture, in addition to the function as the binder.

<<Separators 262 and 264>>

Each of the separators 262 and 264 is a member for separating the positive electrode sheet 220 and the negative electrode sheet 240 from each other, as illustrated in FIGS. 1 and 2. In this example, each of the separators 262 and 264 is made of a strip-shaped sheet having a plurality of micropores and having a predetermined width. For the separators 262 and 264, it is possible to use, for example, a single layer separator or a multi-layered separator, which is made of porous polyolefin-based resin. In this example, as illustrated in FIGS. 2 and 3, the width b1 of the negative electrode active material layer 243 is slightly wider than the width a1 of the positive electrode active material layer 223. In addition, the width c1, c2 of the separators 262 and 264 is slightly wider than the width b1 of the negative electrode active material layer 243 (c1, c2>b1>a1).

In the example shown in FIGS. 1 and 2, each of the separators 262 and 264 is made of a sheet-shaped member. Each of the separators 262 and 264 should be a member that insulates the positive electrode sheet 223 and the negative electrode sheet 243 from each other and at the same time permits transfer of electrolyte. Therefore, the separators are not limited to sheet-shaped members. In place of the sheet-shaped member, each of the separators 262 and 264 may be made of, for example, a layer of insulative particles that are formed on a surface of the positive electrode active material layer 223 or the negative electrode active material layer 243. The insulative particles may be made of an insulative inorganic filler (for example, a filler of metal oxide or metal hydroxide) or insulative resin particles (for example, particles of polyethylene or polypropylene).

<<Battery Case 300>>

In this example, as illustrated in FIG. 1, the battery case 300 is what is called a prismatic battery case, and it includes a case main body 320 and a lid 340. The case main body 320 has a closed-bottom quadrangular prismatic tubular shape, and is a flat-box-shaped case and whose one side face (upper face) is open. The lid 340 is a member that is attached to the opening of the case main body 320 (the opening in the upper face thereof) to close the opening.

For a secondary battery used for a vehicle, it is desired to improve the weight energy efficiency (the capacity of the battery per unit weight) in order to improve the fuel consumption of the vehicle. For this reason, a lightweight metal such as aluminum or an aluminum alloy (aluminum in this example) is employed for the case main body 320 and the lid 340, which constitute the battery case 300, in this embodiment. Thereby, the weight energy efficiency can be improved.

The battery case 300 has a flat rectangular internal space as the space for accommodating the wound electrode assembly 200. As illustrated in FIG. 1, the flat internal space of the battery case 300 is slightly wider than the wound electrode assembly 200. In this embodiment, the battery case 300 has the case main body in a closed-bottom quadrangular prismatic tubular shape and the lid 340 closing the opening of the case main body 340. To the lid 340 of the battery case 300, electrode terminals 420 and 440 are attached. The electrode terminals 420 and 440 penetrate through the battery case 300 (the lid 340) and stick out outside the battery case 300. The lid 340 is provided with a filling port 350 and a safety vent 360.

Figure 6:
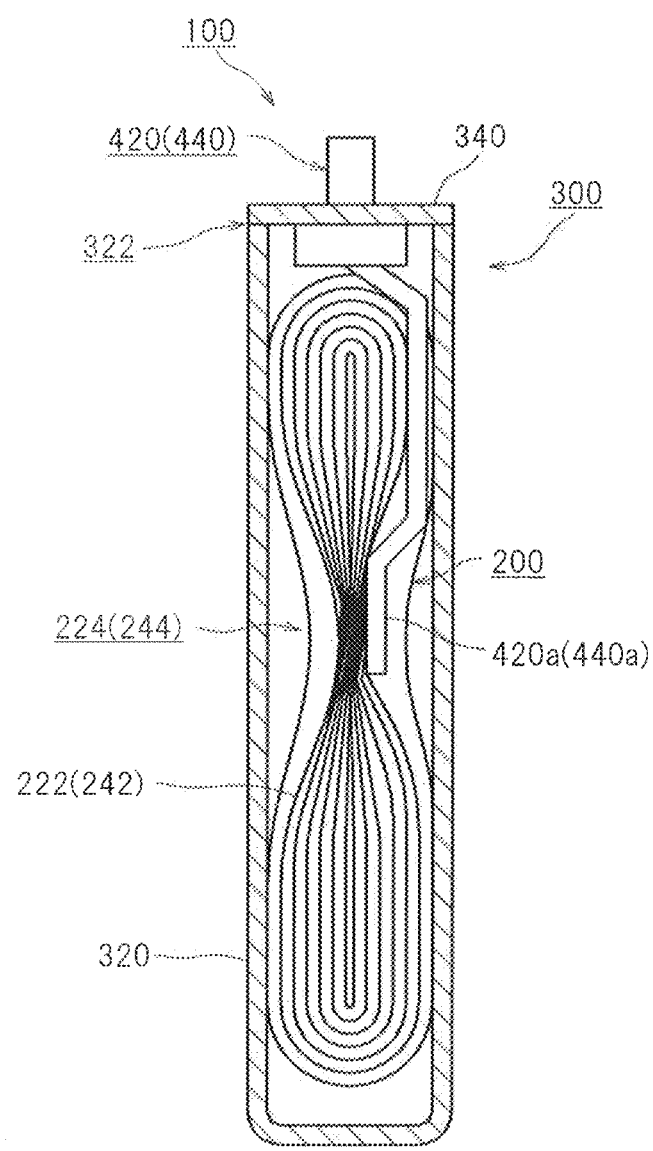
FIG. 6 is a side view illustrating a portion where an uncoated portion of the wound electrode assembly is welded to an electrode terminal.

As illustrated in FIG. 2, the wound electrode assembly 200 is pressed and deformed into a flat shape in one direction orthogonal to the winding axis WL. In the example shown in FIG. 2, the uncoated portion 222 of the positive electrode current collector 221 and the uncoated portion 242 of the negative electrode current collector 241 are exposed from the respective sides of the separators 262 and 264 in a spiral shape. As illustrated in FIG. 6, in this embodiment, the intermediate portions 224 and 244 of the uncoated portions 222 and 242 are gathered and welded to the foremost end portions 420a and 440a of the respective electrode terminals 420 and 440. In this case, from the viewpoint of the difference in materials, ultrasonic welding, for example, is used for welding the electrode terminal 420 to the positive electrode current collector 221. On the other hand, resistance welding, for example, is used for welding the electrode terminal 440 to the negative electrode current collector 241. Here, FIG. 6 is a side view illustrating the portion where the intermediate portion 224 (244) of the uncoated portion 222 (242) of the wound electrode assembly 200 is welded to the electrode terminal 420 (440), and it is also a cross-sectional view taken along line VI-VI in FIG. 1.

The wound electrode assembly 200 is attached to the electrode terminals 420 and 440 fixed to the lid 340 while it is pressed into a flat shape. As illustrated in FIG. 1, the wound electrode assembly 200 is accommodated in the flat internal space of the case main body 320. The case main body 320 is closed by the lid 340 after the wound electrode assembly 200 is placed therein. A joint portion 322 (see FIG. 1) between the lid 340 and the case main body 320 is welded and sealed by, for example, laser welding. Thus, in this example, the wound electrode assembly 200 is positioned in the battery case 300 by the electrode terminals 420 and 440 fixed to the lid 340 (i.e., the battery case 300).

<<Electrolyte Solution>>

Thereafter, an electrolyte solution is filled into the battery case 300 through the filling port 350 provided in the lid 340. What is called a non-aqueous electrolyte solution, which does not use water as the solvent, is used as the electrolyte solution. In this example, the electrolyte solution is an electrolyte solution in which $LiPF_6$ is contained at a concentration of about 1 mol/L in a mixed solvent of ethylene carbonate and diethyl carbonate (e.g., a mixed solvent with a volume ratio of about 1:1). Thereafter, a metal sealing cap 352 is attached (welded, for example) to the filling port 350 to seal the battery case 300. It should be noted that the electrolyte solution is not limited to the examples of the electrolyte solution described herein. For example, any non-aqueous electrolyte solution that has conventionally been used for lithium-ion secondary batteries may be used as appropriate.

<<Pore>>

Here, the positive electrode active material layer 223 has tiny gaps 225, which may be called voids, for example, between the positive electrode active material particles 610 and the particles of the conductive agent 620 (see FIG. 4). The tiny gaps in the positive electrode active material layer 223 can be impregnated with the electrolyte solution (not shown). Also, the negative electrode active material layer 243 has tiny gaps 245, which may be called voids, for example, between the particles of the negative electrode active material 710 (see FIG. 5). Herein, such gaps (or voids) 225 and 245 are referred to as "pores" as appropriate. In addition, in the wound electrode assembly 200, the uncoated portions 222 and 242 are wound in a spiral form at the respective sides along the winding axis WL, as illustrated in FIG. 2. The electrolyte solution can infiltrate through the gaps in the uncoated portions 222 and 242 at the respective sides 252 and 254 along the winding axis WL. Thus, in the lithium-ion secondary battery 100, the electrolyte solution is impregnated throughout the positive electrode active material layer 223 and the negative electrode active material layer 243.

<<Gas Release Passage>>

In this example, the flat internal space of the battery case 300 is slightly wider than the wound electrode assembly 200 deformed in a flat shape. Gaps 310 and 312 are provided between the wound electrode assembly 200 and the battery case 300 at the respective sides of the wound electrode assembly 200. Each of the gaps 310 and 312 serves as a gas release passage. For example, when the temperature of the lithium-ion secondary battery 100 abnormally rises such as in the case of overcharging, it is possible that the electrolyte solution may be decomposed and gas may be generated abnormally. In this embodiment, the abnormally generated gas can move toward the safety vent 360 through the gaps 310 and 312 between the wound electrode assembly 200 and the battery case 300, and is discharged out of the battery case 300 from the safety vent 360.

In the lithium-ion secondary battery 100, the positive electrode current collector 221 and the negative electrode current collector 241 of the wound electrode assembly 200 are electrically connected to an external device via the electrode terminals 420 and 440 penetrating through the battery case 300. The operation of the lithium-ion secondary battery 100 during charge and during discharge will be described in the following.

<<Operation during Charge>>

Figure 7:
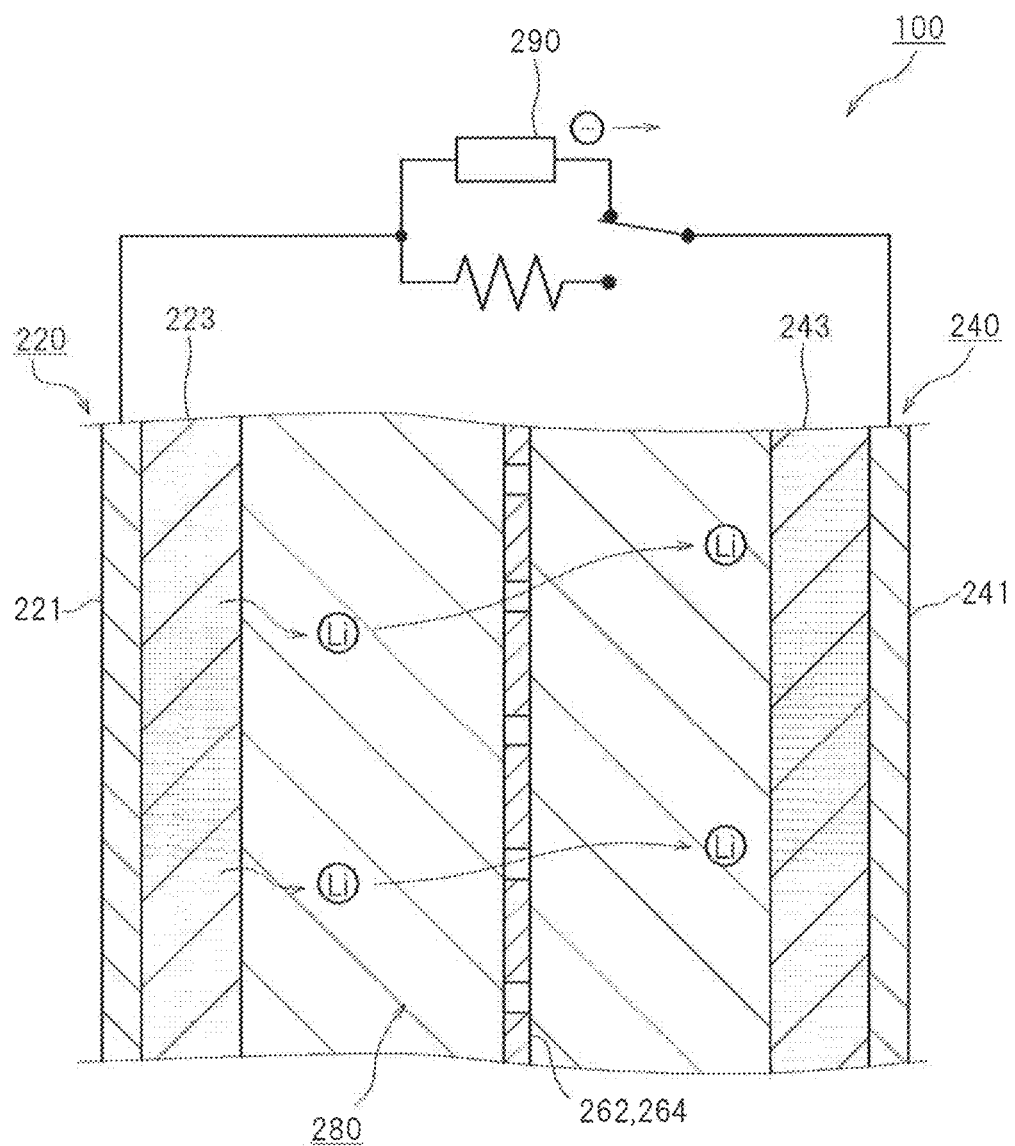
FIG. 7 is a view schematically illustrating a state during charge of the lithium-ion secondary battery.

FIG. 7 schematically illustrates the state of the lithium-ion secondary battery 100 during charge. During charge, the electrode terminals 420 and 440 (see FIG. 1) of the lithium-ion secondary battery 100 are connected to a charger 290, as illustrated in FIG. 7. By the working of the charger 290, lithium ions (Li) are released into the electrolyte solution 280 from the positive electrode active material in the positive electrode active material layer 223 during charge. In addition, electric charge is released from the positive electrode active material layer 223. The released electric charge is transferred through the conductive agent (not shown) to the positive electrode current collector 221 and further transferred through the charger 290 to the negative electrode 240. In the negative electrode 240, electric charge is stored, and also the lithium ions (Li) in the electrolyte solution 280 are absorbed and stored in the negative electrode active material within the negative electrode active material layer 243.

<<Operation during Discharge>>

Figure 8:
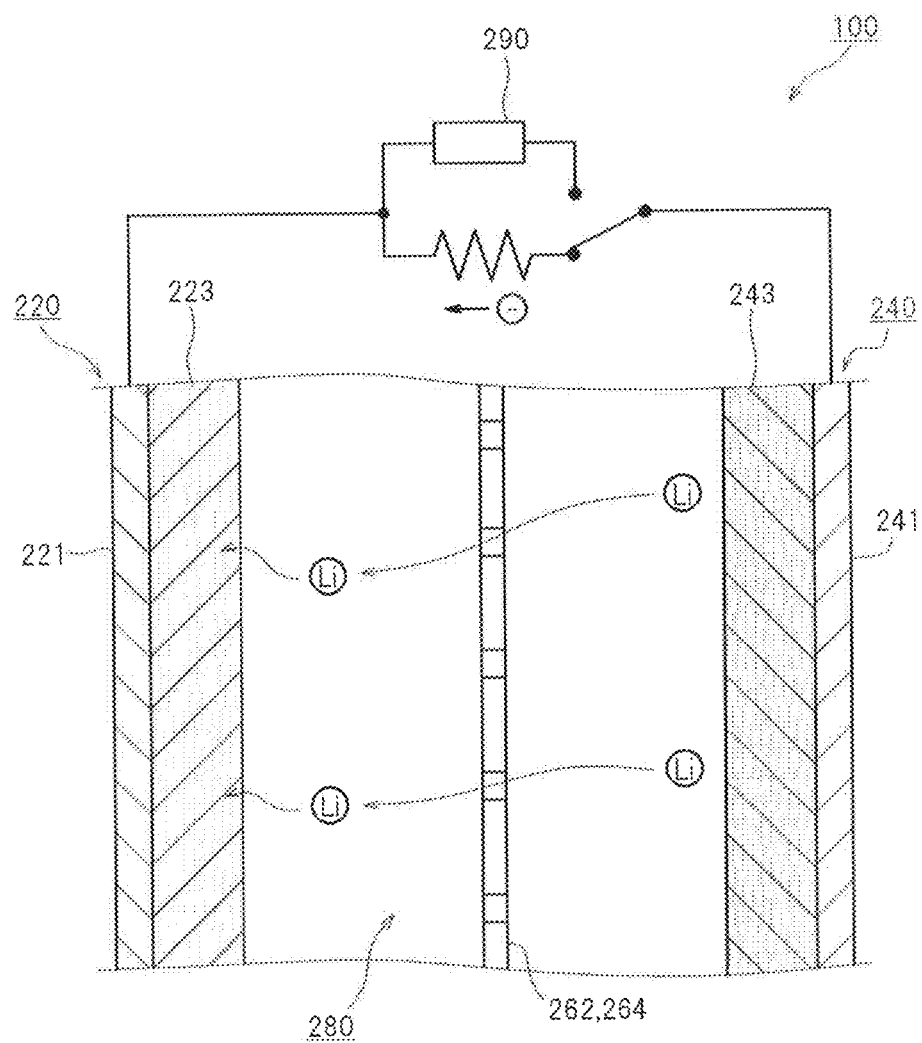
FIG. 8 is a view schematically illustrating a state during discharge of the lithium-ion secondary battery.

FIG. 8 schematically illustrates the state of the lithium-ion secondary battery 100 during discharge. During discharge, as illustrated in FIG. 8, electric charge is transferred from the negative electrode sheet 240 to the positive electrode sheet 220, and at the same time, the lithium ions stored in the negative electrode active material layer 243 are released into the electrolyte solution 280. In the positive electrode, the lithium ions in the electrolyte solution 280 are absorbed into the positive electrode active material within the positive electrode active material layer 223.

Thus, in the charge and discharge of the lithium-ion secondary battery 100, lithium ions are transferred back and forth between the positive electrode active material layer 223 and the negative electrode active material layer 243 via the electrolyte solution 280. In addition, during charge, electric charge is transferred from the positive electrode active material through the conductive agent to the positive electrode current collector 221. On the other hand, during discharge, electric charge is returned from the positive electrode current collector 221 through the conductive agent to the positive electrode active material.

In the case of charge, when the transfer of lithium ions and the transfer of electrons take place more smoothly, it is believed possible to achieve more efficient and rapid charging. In the case of discharge, when the transfer of lithium ions and the transfer of electrons take place more smoothly, the resistance in the battery becomes lower and the amount of discharge becomes higher, so it is believed possible to improve the output power of the battery.

<<Other Battery Constructions>>

It should be noted that the foregoing merely shows one example of the lithium-ion secondary battery. The lithium-ion secondary battery is not limited to the foregoing embodiments. In addition, the electrode sheet in which an electrode mixture is coated on a metal foil may be used in various other types of battery constructions. For example, cylindrical batteries and laminate-type batteries are known as other types of battery constructions. The cylindrical battery is a battery in which a wound electrode assembly is enclosed in a cylindrical battery case. The laminate-type battery is a battery in which an electrode assembly, including positive electrode sheets and negative electrode sheets stacked on each other with separators interposed therebetween, is enclosed in a laminate case.

Hereinbelow, a lithium-ion secondary battery according to one embodiment of the present invention will be described. The lithium-ion secondary battery described here has the same basic structure as that of the foregoing lithium-ion secondary battery 100. Therefore, the description will be made with reference to the drawings of the foregoing lithium-ion secondary battery 100 as appropriate.

As described previously, the lithium-ion secondary battery 100 has the positive electrode current collector 221A and the porous positive electrode active material layer 223A, as illustrated in FIG. 1. As illustrated in FIG. 4, the positive electrode active material layer 223 is retained on the positive electrode current collector 221, and it contains the positive electrode active material particles 610 (positive electrode active material), the conductive agent 620, and the binder 630. As illustrated in FIG. 5, the negative electrode active material layer 243 is retained on the negative electrode current collector 241, and it contains the negative electrode active material particles 710 comprising a graphite material.

In such a lithium-ion secondary battery 100, when the density of the positive electrode active material layer 223 and the density of the negative electrode active material layer 243 are made low, gaps in which the electrolyte solution can be impregnated can be obtained in the positive electrode active material layer 223 and the negative electrode active material layer 243. As a result, lithium ions can transfer smoothly between the electrolyte solution and the positive electrode active material particles 610, and between the electrolyte solution and the negative electrode active material particles 710. This means that, by decreasing the density of the positive electrode active material layer 223 and the density of the negative electrode active material layer 243, the high-rate characteristics of the lithium-ion secondary battery 100 can be improved. The present inventor believes that it is appropriate especially for hybrid electric vehicles and electric vehicles, which require high output power at the time of rapid acceleration, to decrease the density of the positive electrode active material layer 223 and the density of the negative electrode active material layer 243. However, when the density of the negative electrode active material layer 243 is increased to a certain level, the capacity retention ratio after storage in a high-temperature environment (at about 60° C.) may degrade. The present inventor infers that the reason is because cracks develop in the negative electrode active material particles 710, and a passivation film forms at the interface where the negative electrode active material particles 710 absorb and adsorb lithium ions. The present inventor believes that it is desirable to adjust the density of the positive electrode active material layer 223 and the density of the negative electrode active material layer 243 to be low to a certain level, in order to keep high required output power performance and high capacity during high-temperature storage.

However, it has been newly discovered that if both the density of the positive electrode active material layer 223 and the density of the negative electrode active material layer 243 are too low, the resulting lithium-ion secondary battery 100 tends to show lower output power in a low temperature environment (for example, at about −30° C.) and a low state of charge (about 27% SOC).

The present inventor believes that such a tendency results from the following. First of all, the output power performance tends to deteriorate inevitably at a low temperature of about −30° C. Moreover, in a low SOC region, the Li-ion concentration of the active material is high in the positive electrode active material layer 223, and the Li-ion concentration of the active material is low in the negative electrode active material layer 243. Consequently, the ion diffusion tends to become slow during discharge, and the output power performance tends to be low. In addition, when the density of the positive electrode active material layer 223 is low, the particles are sparse in the positive electrode active material layer 223. Consequently, the lower the density of the positive electrode active material layer 223 is, the less the number of contact points between the positive electrode active material particles and the conductive agent is, and consequently, the poorer the electrical conductivity performance of the positive electrode active material layer 223 is. On the other hand, the lower the density of the negative electrode active material layer 243 is, the less the irreversible capacity in the negative electrode tends to be, and the lower the positive electrode potential in a low SOC region tends to be. The present inventor believes that these are the factors that deteriorate the output power performance of the lithium-ion secondary battery in a low temperature environment at about −30° C. and a low SOC region.

Here, the acronym "SOC" means state of charge, and unless particularly stated otherwise, it refers to a state of charge of a battery determined based on the voltage range in which the battery is normally used. Herein, the state of charge was evaluated based on the voltage range in which the upper limit voltage of the voltage between the positive and negative electrode terminals of the lithium-ion secondary battery (OCV: open circuit voltage) is set at about 4.1 V and the lower limit voltage thereof is set at 3.0 V. In addition, the term "low SOC" herein refers to a state of charge of approximately less than or equal to 30% SOC, and the range of from about 28% SOC to about 20% SOC is assumed to be the approximate practical range of low state of charge.

Thus, when both the density of the positive electrode active material layer 223 and the density of the negative electrode active material layer 243 are set low, the output power may be low in a low temperature environment at about −30° C. and in a low state of charge of about 27% SOC. Nevertheless, it is necessary that the density of the positive electrode active material layer 223 and the density of the positive electrode active material layer 223 be set low in order to improve the output power performance of the lithium-ion secondary battery 100 at high rate in the temperature environments and at the state of charge other than in the low temperature environment at about −30° C. and at the low state of charge of about 27% SOC. Moreover, in some cases, the phenomenon may be observed that the capacity deteriorates when the battery is stored in a high temperature environment. For these reasons, it is considered desirable to manage the density of the positive electrode active material layer 223 and the density of the negative electrode active material layer 243 appropriately so that the output power performance of the lithium-ion secondary battery 100 at high rate can be maintained and also the required output power can be ensured even in the low temperature environment and at the low state of charge as described above. The present inventor has devised the positive electrode active material particles 610 appropriately and has also discovered appropriate ranges of the density of the positive electrode active material layer 223 and the density of the negative electrode active material layer 243.

<<Positive Electrode Active Material Particles 610 (Perforated Hollow Particles)>>

Figure 9:
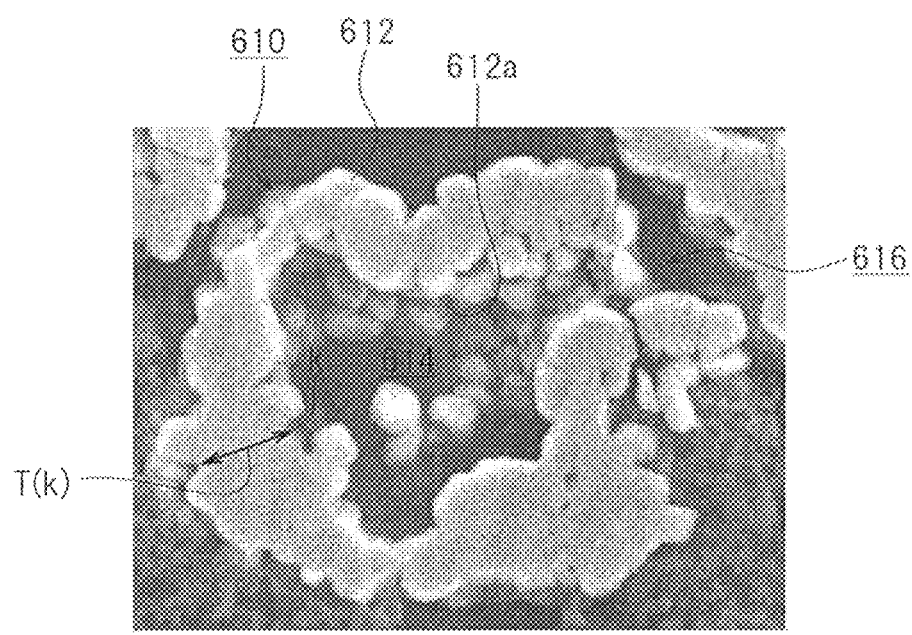
FIG. 9 is a cross-sectional SEM image illustrating a positive electrode active material particle used in a lithium-ion secondary battery according to one embodiment of the present invention.

FIG. 9 is a cross-sectional SEM image illustrating a positive electrode active material particle 610 used in the lithium-ion secondary battery 100 according to one embodiment of the present invention. Herein, as illustrated in FIG. 9, the positive electrode active material particles 610 (perforated hollow particles) each comprise a shell portion 612 comprising a lithium-transition metal oxide, a hollow portion 614 formed inside the shell portion 612, and a through-hole (or through-holes) 616 penetrating through the shell portion 612. It should be noted that herein, the inner surface 612a of the shell portion 612 does not include the portion(s) thereof that corresponds to the through-hole(s) 616 of the positive electrode active material particle 610. In addition, the hollow portion 614 of the positive electrode active material particle 610 does not include the through-hole(s) 616. That is, the positive electrode active material particles 610, used in the lithium-ion secondary battery 100 according to one embodiment of the present invention, each have a hollow structure (also referred to as "perforated hollow structure") having a definite hollow portion 614, as illustrated in FIG. 9, and they are clearly distinguished from solid particles that do not have such a hollow portion 614.

Herein, the phrase "positive electrode active material having a hollow structure" refers to a positive electrode active material such that the proportion of the hollow portion (particle void fraction) is equal to or greater than 5% of the apparent cross-sectional area of the active material. The proportion of the hollow portion may be evaluated based on a cross section cut at a random location in a cross-sectional SEM image of the positive electrode active material layer 223, and it should desirably be evaluated by an approximate mean value (arithmetic mean value) thereof in the positive electrode active material layer 223. At this time, it is desirable to evaluate the hollow portion that has a relatively large space. When there are a plurality of hollow portions having a relatively large space, it is desirable to evaluate the total of the plurality of hollow portions. Very small pores (gaps) that do not reach 5% of the apparent volume may be disregarded. Thus, the positive electrode active material particles 610 used herein are not such particles that merely have pores. For example, they are clearly different from porous particles having a plurality of fine pores (gaps) that are produced by a spray sintering method (also referred to as a spray drying method) in the presence or absence of such a hollow portion 614 having a large space.

Preferably, it is desirable that the positive electrode active material particles 610 have a comparatively large hollow portion 614, as illustrated in FIG. 9, in a cross-sectional SEM image of the positive electrode active material layer 223. The through-hole 616 is formed in the shell portion 612, which forms such a hollow portion 614. In one preferable embodiment of the positive electrode active material particle 610, it is desirable that the proportion of the hollow portion 614 is equal to or greater than 15%, more preferably equal to or greater than 20%, still more preferably equal to or greater than 23%, of the apparent cross-sectional area of the positive electrode active material particle 610. It is desirable that the proportion of the hollow portion 614 in the apparent cross-sectional area of the positive electrode active material particle 610 be evaluated in average of the positive electrode active material layer 223.

When such positive electrode active material particles 610 having a perforated hollow structure are used, the apparent volume of the particles is greater and the particles are bulkier than, for example, solid particles (i.e., particles that do not have a hollow portion) if both particles have the same weight. In addition, in the case of the perforated hollow structure, there is a space inside each of the positive electrode active material particles 610, which means that the space (gap) outside each of the positive electrode active material particles 610 is narrower even if the density of the positive electrode active material layer 223 remains the same. In this case, in the positive electrode active material layer 223, the conductive agent 620 exists more densely outside the positive electrode active material particle 610 even if the proportion of the conductive agent 620 remains the same. Moreover, it is possible to reduce the amount of the binder that serves to bond the positive electrode active material particles 610 to each other. Therefore, the electrical conductivity inside the positive electrode active material layer 223 is high, and the dispersibility of the electrolyte solution (i.e., lithium ions) inside the positive electrode active material layer 223 is high. This remarkably improves the output power performance of the positive electrode active material layer 223.

More preferably, the thickness of the shell portion 612 at an arbitrary position within an inner surface of the shell portion 612 is defined as the minimum distance from the arbitrary position within the inner surface of the shell portion 612 to an outer surface of the shell portion 612, in an arbitrary cross section of the positive electrode active material layer 223. In this case, it is desirable that in the positive electrode active material particles 610, the thickness of the shell portion 612 be less than or equal to 3 µm, more preferably less than or equal to 2.2 µm, in average of the positive electrode active material layer 223. When the thickness of the shell portion 612 of the positive electrode active material particle 610 is thin, less than or equal to 3 µm, the distance in which lithium ions diffuse at the shell portion 612 (inside the positive electrode active material particle 610) is short. This enables to obtain a lithium-ion secondary battery 100 that shows good lithium-ion diffusion and remarkably low resistance. When the shell portion 612 of the positive electrode active material particle 610 is thinner, less than or equal to 2.2 µm, the just-mentioned effect is obtained more significantly.

Furthermore, it is desirable to employ the above-described carbonaceous particles (graphite particles) as the negative electrode active material particles 710 of the negative electrode active material layer 243. Examples include particles of natural graphite, particles of artificial graphite, and more preferably, natural graphite particles at least partially coated (covered) with an amorphous carbon material. In this case, reducing the density of the negative electrode active material layer 243 serves to increase the gaps in the negative electrode active material layer 243, thus improving the dispersibility of the electrolyte solution (i.e., lithium ions) in the negative electrode active material layer 243. Moreover, it serves to enlarge the interface between the negative electrode active material particles 710 and the electrolyte solution, thus improving the lithium-ion diffusion into the negative electrode active material particles 710. Moreover, by reducing the density of the negative electrode active material layer 243 to a certain degree, the capacity retention ratio can be kept high even the battery is stored in a high temperature environment at about 60° C. That is, if the density of the negative electrode active material layer 243 is high, the capacity retention ratio may degrade when the battery is stored in a high-temperature environment at about 60° C. The reason is believed to be as follows. Because the density of the negative electrode active material layer 243 is high, cracks are observed in the negative electrode active material particles 710. On the cracked portions, an SEI (solid electrolyte interphase or solid electrolyte interface) film is formed, so lithium ions are fixed thereto.

If the density of the negative electrode active material layer 243 is set excessively low, the charge capacity per unit volume of the negative electrode active material layer 243 will be low. Accordingly, in order to obtain required output power, the density of the negative electrode active material layer 243 needs to be such a level of density that is necessary to obtain the required output power.

Figure 10:
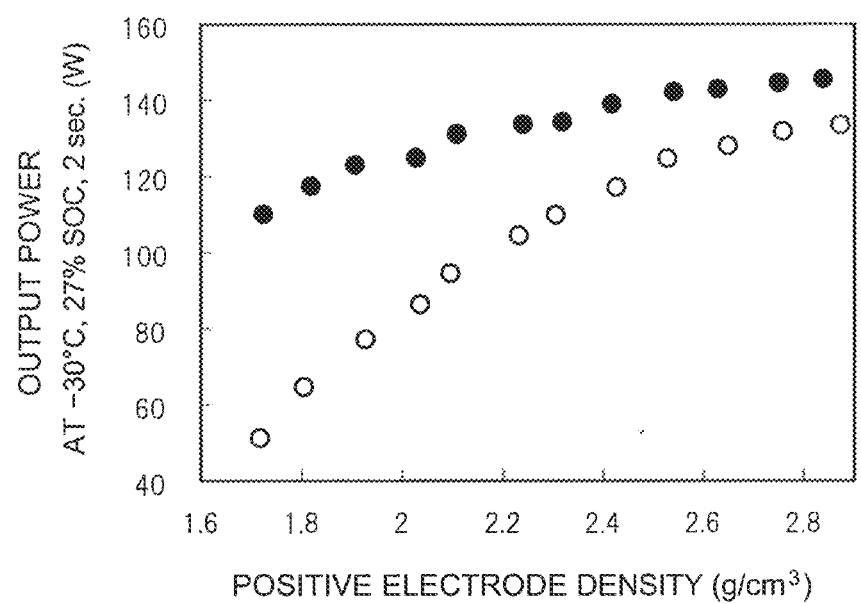
FIG. 10 is a graph illustrating the relationship between density of the positive electrode active material layer and output power (W) of the lithium-ion secondary battery at −30° C. and 27% SOC.

Here, FIG. 10 shows the relationship between the density of the positive electrode active material layer 223 and the output power (W) of the lithium-ion secondary battery at −30° ° C. and at 27% SOC. In the examples shown in FIG. 10, the density of the negative electrode active material layer 243 was set at 1.13 g/cm$^3$. In the figure, the black circle plots (●) represent the cases in which positive electrode active material particles 610 having the perforated hollow structure are used for the positive electrode active material layer 223, which are lithium-ion secondary batteries 100 according to one embodiment of the present invention. On the other hand, the white circle plots (○) represent the cases in which positive electrode active material particles 610 having a solid structure are used for the positive electrode active material layer 223.

As indicated by the black circle plots (●) in FIG. 10, in the cases where the positive electrode active material particles 610 having the perforated hollow structure are used for the positive electrode active material layer 223, the output power (W) of the lithium-ion secondary battery 100 at −30° C. and at 27% SOC can be kept somewhat high even when the density of the positive electrode active material layer 223 is reduced. As indicated by the white circle plots (○), in the cases where the positive electrode active material particles 610 having a solid structure are used for the positive electrode active material layer 223, the output power (W) of the lithium-ion secondary battery 100 at −30° C. and at 27% SOC gradually decreases as the density of the positive electrode active material layer 223 is reduced. In addition, when the density of the positive electrode active material layer 223 becomes lower than a certain point (lower than about 2.4 g/cm$^3$ in the examples shown in FIG. 10), the output power (W) of the lithium-ion secondary battery at −30° C. and at 27% SOC becomes considerably low. Thus, by employing the positive electrode active material particles 610 having a perforated hollow structure, the output power (W) of the lithium-ion secondary battery at −30° C. and at 27% SOC can be kept high.

Figure 11:
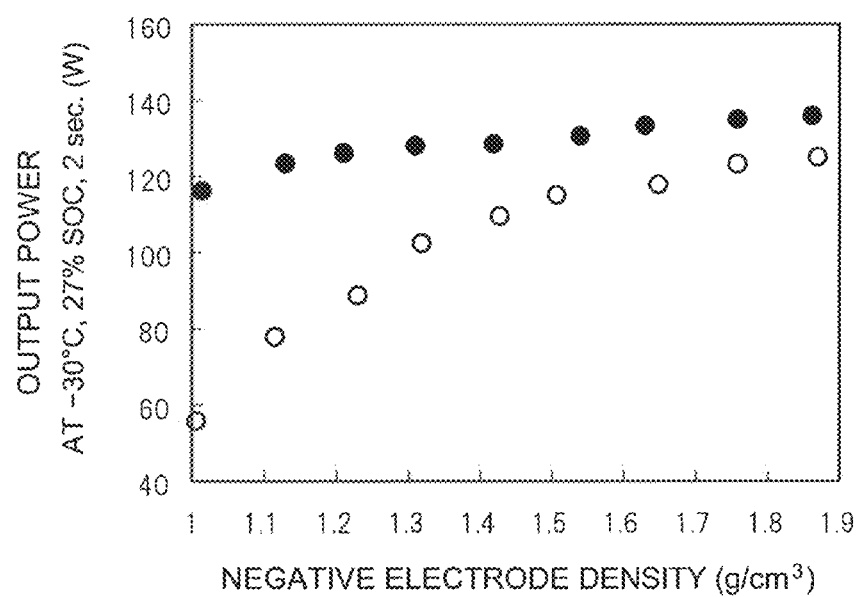
FIG. 11 is a graph illustrating the relationship between density of the negative electrode active material layer and output power (W) at −30° C. and 27% SOC.

FIG. 11 illustrates the relationship between the density of the negative electrode active material layer 243 and the output power (W) at −30° C. and at 27% SOC. In the examples shown in FIG. 11, the density of the positive electrode active material layer 223 was set at 1.92 g/cm$^3$. In this figure as well, the black circle plots (●) represent the cases in which positive electrode active material particles 610 having the perforated hollow structure are used for the positive electrode active material layer 223, which are lithium-ion secondary batteries 100 according to one embodiment of the present invention. Likewise, the white circle plots (○) represent the cases in which positive electrode active material particles 610 having a solid structure are used for the positive electrode active material layer 223.

As indicated by the black circle plots (●) in FIG. 11, in the cases where the positive electrode active material particles 610 having the perforated hollow structure are used for the positive electrode active material layer 223, the output power (W) of the lithium-ion secondary battery 100 at −30° C. and at 27% SOC can be kept somewhat high even when the density of the negative electrode active material layer 243 is reduced. As indicated by the white circle plots (○), in the cases where the positive electrode active material particles 610 having a solid structure are used for the positive electrode active material layer 223, the output power (W) of the lithium-ion secondary battery at −30° C. and at 27% SOC gradually decreases as the density of the negative electrode active material layer 243 is reduced. In addition, when the density of the positive electrode active material layer 243 becomes lower than a certain point (lower than about 1.5 g/cm$^3$ in the examples shown in FIG. 11), the output power (W) of the lithium-ion secondary battery at −30° C. and at 27% SOC becomes considerably low. Thus, by employing the positive electrode active material particles 610 having a perforated hollow structure, the output power (W) of the lithium-ion secondary battery at −30° C. and at 27% SOC can be kept high.

<<Test Battery>>

Hereinbelow, the test battery used in such a test is described.

In the examples shown in FIGS. 10 and 11, the compositional formula of the composite oxide used as the positive electrode active material particles 610 is as follows, both for the solid particles and for the particles having a perforated hollow structure.

Positive electrode active material particles 610: $Li_{1.14}Ni_{0.34}Co_{0.33}Mn_{0.33}O_2$ Herein, the positive electrode active material particles of the above compositional formula ($Li_{1.14}Ni_{0.34}Co_{0.33}Mn_{0.33}O_2$) is shown as an example of the positive electrode active material particles 610. However, this is merely an example of the positive electrode active material particles of the lithium-ion secondary battery according to one embodiment of the present invention, and the positive electrode active material particles of the lithium-ion secondary battery of the present invention is not particularly limited to the active material of the composition formula ($Li_{1.14}Ni_{0.34}Co_{0.33}Mn_{0.33}O_2$).

<Solid Positive Electrode Active Material Particles>

Herein, as for solid positive electrode active material particles, a mixture solution of nickel sulfate, cobalt sulfate, and manganese sulfate is neutralized with sodium hydroxide to prepare a precursor having the basic composition $Ni_{0.34}Co_{0.33}Mn_{0.33}(OH)_2$. Next, the obtained precursor is mixed with lithium carbonate, and the mixture is sintered in an air atmosphere at a temperature of from about 800° C. to 900° C. for 5 hours to 15 hours. Thus, solid particles of the above formula $Li_{1.14}Ni_{0.34}Co_{0.33}Mn_{0.33}O_2$ can be obtained. Then, the thus-obtained particles are sieved, to thereby obtain solid positive electrode active material particles having an average particle size D50 of from about 3 μm to about 8 μm and a specific surface area of from about 0.5 m$^2$/g to about 1.9 m$^2$/g.

<Positive Electrode Active Material Particles Having a Perforated Hollow Structure>

Herein, the perforated hollow structure was made to have the same composition $Li_{1.14}Ni_{0.34}Co_{0.33}Mn_{0.33}O_2$ as that of the solid particles. Herein, the proportion of the hollow portion 614 was set at about 23%, and the thickness of the shell portion 612 was set at about 2.2 μm. Unless otherwise stated, the positive electrode active material particles are not limited to such an embodiment. The method of manufacturing the positive electrode active material particles having the perforated hollow structure will be described in detail later.

<Positive Electrode Paste and Positive Electrode Sheet>

Here, acetylene black was used as the conductive agent, and polyvinylidene fluoride (PVDF) was used as the binder (binder agent). Positive electrode active material particles, acetylene black, and PVDF were mixed in a weight ratio of 90 mass %:8 mass %:2 mass %, respectively, and kneaded with N-methyl-2-pyrrolidone (NMP) as a solvent, to prepare a positive electrode paste. The resultant positive electrode paste was applied onto both sides of a positive electrode current collector (15 μm-thick aluminum foil) and then dried, to obtain positive electrode mixture layers. At this time, the positive electrode paste was applied so that the total weight per unit area thereof after dried (excluding NMP) would be 11.2 mg/cm$^2$ in total of both sides. In addition, the density of the positive electrode mixture layers was adjusted by roll-pressing.

<<Density a of Positive Electrode Active Material Layer 223>>

Here, as described earlier, the positive electrode active material layer 223 contains pores (gaps) so that the electrolyte solution can be impregnated therein. The density A of the positive electrode active material layer 223 is evaluated by apparent density. More specifically, the density A of the positive electrode active material layer 223 can be obtained by dividing the weight of the positive electrode active material layer 223 by the volume (apparent volume) of the positive electrode active material layer 223 including the gaps.

> Density $A$ of the positive electrode active material layer 223=(Weight of positive electrode active material layer 223)/(Volume of positive electrode active material layer 223 including gaps)

<Weight of Positive Electrode Active Material Layer 223>

The weight of the positive electrode active material layer 223 can preferably be obtained by, for example, cutting out the positive electrode sheet 220 in a predetermined area, and subtracting the weight of the positive electrode current collector 221 from the weight of the cut-out positive electrode sheet 220.

> Weight of positive electrode active material layer 223=(Weight of positive electrode sheet 220)−(Weight of positive electrode current collector 221 contained in positive electrode sheet 220)

Here, the weight of the positive electrode current collector 221 contained in the positive electrode sheet 220 cut out in a predetermined area can be obtained as the product of the volume and the specific gravity of the positive electrode current collector 221. The thickness of the positive electrode current collector 221 can approximately be measured. The thickness of the metal foil used as the positive electrode current collector 221 can be employed, as it is, as the thickness of the positive electrode current collector 221. When the thickness of the positive electrode current collector 221 is identified, the volume of the positive electrode current collector 221 contained in the positive electrode sheet 220 cut out in a predetermined area can be accordingly identified. Also, the specific gravity of the metal (aluminum (Al) herein) used as the positive electrode current collector 221 is known approximately. Then, the weight of the positive electrode current collector 221 contained in the positive electrode sheet 220 cut out in a predetermined area can be obtained by the product of the volume of the positive electrode current collector 221 and the specific gravity of the metal used for the positive electrode current collector 221.

<Volume of Positive Electrode Active Material Layer 223 Including Gaps (Apparent Volume)>

The approximate thickness of the positive electrode active material layer 223 can be obtained by subtracting the thickness of the positive electrode current collector 221 cut out in a predetermined area from the thickness of the positive electrode sheet 220. It is preferable to obtain the thickness of the positive electrode sheet 220 by measuring the thickness at a plurality of locations and approximating it by arithmetic mean. The thickness of the metal foil used as the positive electrode current collector 221, for example, can be used, as it is, as the thickness of the positive electrode current collector 221. The volume of the positive electrode active material layer 223 including gaps (apparent volume) can be obtained by the product of the thickness of the positive electrode active material layer 223 and the area of the cut-out positive electrode sheet 220.

Volume of positive electrode active material layer 223 including gaps (apparent volume)=(Thickness of positive electrode active material layer 223)×(Area of cut-out positive electrode sheet 220)

<Negative Electrode Active Material Particles 710>

Natural graphite particles at least partially coated (covered) with an amorphous carbon material were used for the negative electrode active material particles 710 used for the negative electrode active material layer 243. Herein, 96 mass % of natural graphite powder was mixed and impregnated with 4 mass % of pitch, and the resultant mixture material was sintered under an inert atmosphere at 1000° C. to 1300° C. for 10 hours. As a result, negative electrode active material particles were obtained, which had an average particle size D50 of from about 8 μm to about 11 μm and a specific surface area of from about 3.5 $m^2/g$ to about 5.5 $m^2/g$. Unless otherwise stated, the negative electrode active material particles are not limited to such an embodiment.

<Negative Electrode Paste and Negative Electrode Sheet>

Herein, carboxymethylcellulose (CMC) was used as a thickening agent, and styrene-butadiene rubber (SBR) was used as a binder (binder agent). Then, the negative electrode active material particles, CMC, and SBR were mixed in a weight ratio of 98.6 mass %:0.7 mass %:0.7 mass %, respectively, and kneaded with water as a solvent, to prepare a negative electrode paste. The resultant negative electrode paste was applied onto both sides of a negative electrode current collector (10 μm-thick copper foil) and then dried, to obtain negative electrode mixture layers. At this time, the negative electrode paste was applied so that the total weight per unit area thereof after dried (excluding water) would be 7.3 $mg/cm^2$ in total of both sides. In addition, the density of the negative electrode mixture layers was adjusted by roll-pressing.

<<Density B of Negative Electrode Active Material Layer 243>>

Next, the negative electrode active material layer 243 contains pores (gaps) so that the electrolyte solution can be impregnated therein. The density B of the negative electrode active material layer 243 is evaluated by apparent density. For example, the density B of the negative electrode active material layer 243 can be obtained by dividing the weight of the negative electrode active material layer 243 by the volume (apparent volume) of the negative electrode active material layer 243 including the gaps.

Density B of negative electrode active material layer 243=(Weight of negative electrode active material layer 243)/(Volume of negative electrode active material layer 243 including gaps)

<Weight of Negative Electrode Active Material Layer 243>

The weight of the negative electrode active material layer 243 can preferably be obtained by cutting out the negative electrode sheet 240 in a predetermined area, and subtracting the weight of the negative electrode current collector 241 from the weight of the cut-out negative electrode sheet 240.

Weight of negative electrode active material layer 243=(Weight of negative electrode sheet 240)−(Weight of negative electrode current collector 241 contained in negative electrode sheet 240)

Here, the weight of the negative electrode current collector 241 contained in the negative electrode sheet 240 cut out in a predetermined area can be obtained as the product of the volume and the specific gravity of the negative electrode current collector 241. The thickness of the negative electrode current collector 241 can approximately be measured. The thickness of the metal foil used as the negative electrode current collector 241 can be employed, as it is, as the thickness of the negative electrode current collector 241. When the thickness of the negative electrode current collector 241 is identified, the volume of the negative electrode current collector 241 contained in the negative electrode sheet 240 cut out in a predetermined area can be accordingly identified. Also, the specific gravity of the metal (copper (Cu) herein) used as the negative electrode current collector 241 is known approximately. Then, the weight of the negative electrode current collector 241 contained in the negative electrode sheet 240 cut out in a predetermined area can be obtained by the product of the volume of the negative electrode current collector 241 and the specific gravity of the metal used for the negative electrode current collector 241.

<Volume of Negative Electrode Active Material Layer 243 Including Gaps (Apparent Volume)>

The approximate thickness of the negative electrode active material layer 243 can be obtained by subtracting the thickness of the negative electrode current collector 241 cut out in a predetermined area from the thickness of the negative electrode sheet 240. The volume of the negative electrode active material layer 243 including gaps (apparent volume) can be obtained by the product of the thickness of the negative electrode active material layer 243 and the area of the cut-out negative electrode sheet 240.

Volume of negative electrode active material layer 243 including gaps=(Thickness of negative electrode active material layer 243)×(Area of cut-out negative electrode sheet 240)

<<Other Specifications of the Test Battery>>

Herein, the coating width of the positive electrode was set at 90 mm, and the length thereof was set at 3000 mm. The coating width of the negative electrode was set at 102 mm, and the length thereof was set at 3200 mm. With these positive and negative electrodes, the wound electrode assembly 200 (see FIGS. 1 and 2) was constructed and enclosed in the prismatic battery case 300. Here, the number of windings of the wound electrode assembly 200 (the number of turns thereof that is bent in a flat shape) was set at about 29 turns. Here, the capacity ratio of the positive electrode to the negative electrode (the charge capacity of the positive electrode/the charge capacity of the negative electrode) was adjusted to be from about 1.5 to about 1.9.

The electrolyte solution used here was as follows. Ethylene carbonate (EC), ethyl methyl carbonate (EMC), and dimethyl carbonate (DMC) were mixed at a mass ratio of 3:3:4, and 1.1 mol/L of $LiPF_6$ was dissolved in the mixture. In addition, a difluorophosphate salt ($LiPO_2F_2$) and lithium bis(oxalato)borate (LiBOB) were dissolved therein at about 0.025 mol/L each, to prepare the electrolyte solution. The battery capacity (rated capacity) was 3.8 Ah.

As is demonstrated in FIGS. 10 and 11, the present inventor believes that it is desirable to employ the positive electrode active material particles 610 having the perforated hollow structure as the active material of the positive electrode active material layer 223, and moreover to appropriately manage the density of the positive electrode active material layer 223 and the density of the negative electrode active material layer 243, from the viewpoint of improving the output power (W) at −30° C. and at 27% SOC. The present inventor proposes herein that the density A of the positive electrode active material layer 223 should be set approximately at $1.80 \text{ g/cm}^3 \leq A \leq 2.35 \text{ g/cm}^3$, and the density B of the negative electrode active material layer 243 should be set approximately at $0.95 \text{ g/cm}^3 \leq B \leq 1.25 \text{ g/cm}^3$. Such a lithium-ion secondary battery 100 makes it possible to, for example, keep high output power even in a low temperature environment at about −30° C. and to minimize the capacity degradation due to storage in a high temperature environment at about 60° C. Moreover, such a lithium-ion secondary battery 100 can minimize the resistance increase resulting from high-rate cycling.

The lithium-transition metal oxide that constitutes the positive electrode active material particles 610 may contain, for example, at least one metal element ($M_T$) selected from the group consisting of Ni, Co, and Mn. For example, the lithium-transition metal oxide may contain all of Ni, Co, and Mn as the metal elements ($M_T$).

The lithium-transition metal oxide that constitutes the positive electrode active material particles 610 may further contain at least one metal element ($M_A$) selected from the group consisting of W, Cr, and Mo. In this case, the content $m_{MA}$ of the metal element $M_A$ may be from 0.05 mole % to 1 mole %, when the total number $m_{MT}$ of moles of Ni, Co, and Mn contained in the lithium-transition metal oxide that constitutes the positive electrode active material particles 610 is set at 100 mole % expressed in mole percentage. Hereinbelow, an example of the method of manufacturing the positive electrode active material particles 610 (perforated hollow particles) will be described.

<<Method of Manufacturing Positive Electrode Active Material Particles 610 (Perforated Hollow Particles)>>

The method of manufacturing the positive electrode active material particles 610 includes, for example, a source hydroxide producing step, a mixing step, and a sintering step. The source hydroxide producing step is a step of supplying ammonium ions to an aqueous solution of a transition metal compound to precipitate particles of the transition metal hydroxide from the aqueous solution. Here, the aqueous solution contains at least one transition metal element that constitutes the lithium-transition metal oxide.

Herein, it is desirable that the source hydroxide producing step include a nucleation stage of precipitating a transition metal hydroxide from the aqueous solution and a particle growth stage of growing the transition metal hydroxide in a condition in which the pH of the aqueous solution is lower than that at the nucleation stage.

The mixing step is a step of mixing a lithium compound and the transition metal hydroxide to prepare an unsintered mixture. The sintering step is a step of sintering the mixture to obtain the positive electrode active material particles 610. More preferably, it is desirable to pulverize the sintered material after the sintering and to sieve and classify the material.

Hereinbelow, the method of manufacturing the positive electrode active material particles 610 will be described in more detail.

The perforated hollow active material particles disclosed herein can be manufactured by, for example, the method including precipitating a hydroxide of at least one transition metal element contained in the lithium-transition metal oxide that constitutes the active material particles (preferably all the metal elements contained in the lithium-transition metal oxide other than lithium) from an aqueous solution containing the transition metal element(s) under an appropriate condition, then mixing the transition metal hydroxide with a lithium compound, and sintering the mixture.

Also, one embodiment of the method of manufacturing the active material particles will be described in detail, taking a case of manufacturing perforated hollow active material particles comprising a layered LiNiCoMn oxide as an example. However, the applications of this manufacturing method are not limited to the manufacturing of the perforated hollow active material particles having such a composition. In addition, unless otherwise stated, the positive electrode active material particles are not limited to those manufactured by such a manufacturing method.

<<Source Hydroxide Producing Step>>

The method of manufacturing active material particles disclosed herein includes a step of supplying ammonium ions ($NH_4^+$) to an aqueous solution of a transition metal compound to precipitate particles of a transition metal hydroxide from the aqueous solution (source hydroxide producing step). The solvent (aqueous solvent) that constitutes the above-mentioned aqueous solution is typically water, but may be a mixed solvent containing water as its main component. A suitable example of the solvent that constitutes the mixed solvent other than water is an organic solvent that can mix with water uniformly (such as a lower alcohol). Depending on the composition of the lithium-transition metal oxide that constitutes the active material particles that are the target object to be manufactured, the above-described aqueous solution of a transition metal compound (hereinafter also referred to as "transition metal solution") contains at least one of (preferably all of) the transition metal elements (herein, Ni, Co, and Mn) that constitute the lithium-transition metal oxide. For example, it is possible to use a transition metal solution containing one compound, or two or more compounds, that can supply Ni ions, Co ions, and Mn ions into the aqueous solvent. As the compounds that serve as the source of these metallic ions, it is possible to employ sulfates, nitrates, chlorides, or the like of those metals appropriately. For example, it is possible to use a transition metal solution having the composition in which nickel sulfate, cobalt sulfate, and manganese sulfate are dissolved in an aqueous solvent (preferably water).

The $NH_4^+$ may be supplied to the transition metal solution, for example, in the form of aqueous solution (typically water solution) containing $NH_4^+$, or may be supplied by blowing ammonia gas directly into the transition metal solution. These supplying methods may be combined with each other. The aqueous solution containing $NH_4^+$ can be prepared by, for example, dissolving a compound that can be the source of $NH_4^+$ (such as ammonium hydroxide, ammonium nitrate, or ammonia gas) into an aqueous solvent.

In the present embodiment, $NH_4^+$ is supplied in the form of ammonium hydroxide aqueous solution (i.e., ammonia water).

<<Nucleation Stage>>

The source hydroxide producing step can include a stage (nucleation stage) of precipitating a transition metal hydroxide from the transition metal solution under the conditions of equal to or higher than pH 12 (typically from pH 12 to pH 14, for example, from pH 12.2 to 13) and a $NH_4^+$ concentration of less than or equal to 25 g/L (typically from 3 g/L to 25 g/L). The just-mentioned pH and the $NH_4^+$ concentration may be adjusted by appropriately balancing the amounts of the ammonia water and the alkaline agent (the compound that can cause the solution to become alkaline) that are used. Examples of the alkaline agent include sodium hydroxide and potassium hydroxide, which can be typically used in the form of aqueous solution. The present embodiment employs a sodium hydroxide aqueous solution. It should be noted that the pH values mentioned in the present description are the pH values determined at a liquid temperature of 25° C. as the reference.

<<Particle Growth Stage>>

The source hydroxide producing step can further include a stage (particle growth stage) of growing the nuclei of the transition metal hydroxide (typically in a particulate form) that have been precipitated in the nucleation stage at less than pH 12 (typically from pH 10 to less than pH 12, preferably from pH 10 to pH 11.8, for example, from pH 11 to pH 11.8) and a $NH_4^+$ concentration of equal to or higher than 1 g/L, preferably 3 g/L, (typically from 3 g/L to 25 g/L). Normally, it is appropriate to set the pH during the particle growth stage to be lower by 0.1 or greater (typically 0.3 or greater, preferably 0.5 or greater, for example, from about 0.5 to about 1.5) than the pH during the nucleation stage.

The just-mentioned pH and the $NH_4^+$ concentration can be adjusted in the same manner as in the nucleation stage. This particle growth stage allows the rate of precipitation of the transition metal hydroxide (a composite hydroxide containing Ni, Co, and Mn herein) to be quicker by satisfying the pH and the $NH_4^+$ concentration described above, preferably by setting the $NH_4^+$ concentration to be within the range of less than or equal to 15 g/L (e.g., from 1 g/L to 15 g/L, typically from 3 g/L to 15 g/L), more preferably less than or equal to 10 g/L (e.g., from 1 g/L to 10 g/L, typically from 3 g/L to 10 g/L) in the above-described pH range. As a result, it becomes possible to produce the source hydroxide particles that are suitable for the formation of the perforated hollow active material particles disclosed herein (in other words, the source hydroxide particles that can easily form a sintered material having a perforated hollow structure).

The $NH_4^+$ concentration may be set to less than or equal to 7 g/L (e.g., from 1 g/L to 7 g/L, more preferably from 3 g/L to 7 g/L). The $NH_4^+$ concentration at the particle growth stage may be, for example, approximately the same level as the $NH_4^+$ concentration at the nucleation stage, or may be lower than the $NH_4^+$ concentration at the nucleation stage. The rate of precipitation of the transition metal hydroxide can be found by, for example, investigating the change of the total mole number (total ion concentration) of the transition metal ions contained in the liquid phase of the reaction solution with respect to the total mole number of the transition metal ions contained in the transition metal solution supplied to the reaction solution.

It is preferable that the temperature of the reaction solution be controlled to approximately a constant temperature (for example, ±1° C. of a predetermined temperature) within the range of from about 30° C. to about 60° C., in both the nucleation stage and the particle growth stage. The temperature of the reaction solution may be substantially the same in both the nucleation stage and the particle growth stage. In addition, it is preferable that the atmosphere of the reaction solution and in the reaction chamber be kept to be a non-oxidizing atmosphere throughout the nucleation stage and the particle growth stage. In addition, the total mole number (total ion concentration) of Ni ions, Co ions, and Mn ions contained in the reaction solution may be set to be from about 0.5 mol/L to about 2.5 mol/L throughout the nucleation stage and the particle growth stage, preferably from about 1.0 mol/L to 2.2 mol/L. It is desirable that the transition metal solution be supplemented (typically continuously supplied) according to the rate of precipitation of the transition metal hydroxide so that such a total ion concentration can be maintained. It is preferable that the amounts of the Ni ions, the Co ions, and the Mn ions contained in the reaction solution may be set to the quality ratio corresponding to the composition of the active material particles that are the target material (i.e., the mole ratio of Ni, Co, and Mn in the LiNiCoMn oxide that constitutes the active material particles).

<<Mixing Step>>

In the present embodiment, the transition metal hydroxide particles (composite hydroxide particles containing Ni, Co, and Mn herein) are separated from the reaction solution, then washed, and dried. Then, the transition metal hydroxide particles and a lithium compound are mixed at a desired quantity ratio to prepare an unsintered mixture (mixing step). In this mixing step, typically, the Li compound and the transition metal hydroxide particles are mixed at a quantity ratio corresponding to the composition of the active material particles that are the target material (i.e., the mole ratio of Li, Ni. Co, and Mn in the LiNiCoMn oxide that constitutes the active material particles). Preferable examples of the lithium compound include Li compounds that can be melted and turned into an oxide by heating, such as lithium carbonate and lithium hydroxide.

<<Sintering Step>>

Then, the mixture is sintered to obtain active material particles (sintering step). This sintering step is typically performed in an oxidizing atmosphere (for example, in the air (i.e., in the air atmosphere)). The sintering temperature in this sintering step may be set to, for example, from 700° C. to 1100° C. It is preferable that the maximum sintering temperature be 800° C. or higher (preferably from 800° C. to 1100° C., for example, from 800° C. to 1050° C.). With the maximum sintering temperature in these ranges, the sintering reaction of the primary particles of the lithium-transition metal oxide (preferably Ni-containing Li oxide, LiNiCoMn oxide herein) can be allowed to proceed appropriately.

One preferable embodiment includes a first sintering stage of sintering the mixture at a temperature T1 of from 700° C.

to 900° C. (that is, 700° C.≤T1≤900° C., for example, 700° C.≤T1≤800° C., typically 700° C.≤T1≤800° C.) and a second sintering stage of sintering the resultant article that has undergone the first sintering stage at a temperature T2 of from 800° C. to 1100° C. (that is, 800° C.≤T2≤1100° C., for example, 800° C.≤T2≤1050° C.). This enables to form the active material particles with the perforated hollow structure efficiently. It is preferable that T1 and T2 be set so that T1≤T2.

The first sintering stage and the second sintering stage may be carried out consecutively (for example, it is possible that, after the mixture is kept at the first sintering temperature T1, the temperature is continuously elevated to the second sintering temperature T2 and kept at the temperature T2). Alternatively, it is also possible that, after having been kept at the first sintering temperature T1, the material is cooled (for example, cooled to room temperature), then pulverized, and sieve-classified as necessary, and thereafter supplied to the second sintering stage.

In the technique disclosed herein, the first sintering stage can be understood as a stage during which sintering is carried out at the temperature T1 that is within a temperature range at which the sintering reaction for the target lithium-transition metal oxide proceeds, and lower than or equal to the melting point, and is lower than the temperature of the second sintering stage. The second sintering stage can be understood as a stage during which sintering is carried out at the temperature T2 that is in a temperature range at which the sintering reaction for the target lithium-transition metal oxide proceeds, and lower than or equal to the melting point, but is higher than the temperature of the first sintering stage. It is preferable to provide a temperature difference of equal to or greater than 50° C. or more (typically equal to or greater than 100° C., for example, equal to or greater than 150° C.) between T1 and T2.

Thus, the method of manufacturing the positive electrode active material particles 610 includes the source hydroxide producing step, the mixing step, and the sintering step. Herein, it is desirable to stably obtain such positive electrode active material particles 610 that the proportion of the hollow portion 614 in the apparent cross-sectional area of the positive electrode active material particle 610 is equal to or greater than 15%, more preferably equal to or greater than 20%, still more preferably equal to or greater than 23%, and that the thickness T of the shell portion 612 of the positive electrode active material particle 610 is thin, less than or equal to 3.0 μm, more preferably less than or equal to 2.2 μm. The following describes a method of manufacturing positive electrode active material particles 610, which enables to obtain the positive electrode active material particles 610 such as described above more stably.

In order to obtain the positive electrode active material particles 610 more stably, it is desirable to appropriately adjust the pH or the $NH_4^+$ concentration at the stage of precipitating the transition metal hydroxide from the transition metal solution (i.e., the nucleation stage) and the pH or the $NH_4^+$ concentration at the stage (particle growth stage) particle growth stage of growing the nuclei of the transition metal hydroxide that have been precipitated at the nucleation stage.

In such a transition metal solution, the following equilibrium reaction is taking place, for example.

[Chemical formula 1]

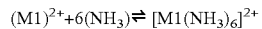
            Reaction 1

[Chemical formula 2]

            Reaction 2

Here, M1 represents the transition metals contained in the transition metal solution, which include Ni in this embodiment.

That is, in the equilibrium reaction of Reaction 1, the reaction between the transition metal (M1) in the transition metal solution, the ammonia ($NH_3$) supplied to the transition metal solution, and the compound $[M1(NH_3)_6]^{2+}$ of the transition metal (M1) and ammonia ($NH_3$) is in equilibrium. In the equilibrium reaction of Reaction 2, the reaction between the transition metal (M1) in the transition metal solution, the hydroxide ions ($OH^-$) supplied to the transition metal solution, and the transition metal hydroxide [$M1(OH)_2$] is in equilibrium.

In this case, when the pH in the transition metal solution decreases, the transition metal hydroxide ($M1(OH)_2$) tends to precipitate easily by the equilibrium reaction of Reaction 2. At this time, the transition metal hydroxide ($M1(OH)_2$) is allowed to precipitate easily by keeping the amount of ammonia in the transition metal solution small, proceeding the equilibrium expression to the left side, and increasing the transition metal ions $(M1)^{2+}$ in the transition metal solution. Thus, the transition metal hydroxide ($M1(OH)_2$) is allowed to precipitate easily by keeping the amount of ammonia in the transition metal solution small and decreasing the pH in the transition metal solution.

For example, at the nucleation stage, the pH should be kept to a certain degree while keeping the solubility of the ammonia ($NH_3$) in the transition metal solution to be low. This makes it possible to control the rate of precipitation of the transition metal hydroxide ($M1(OH)_2$) appropriately. Moreover, this allows the density of the inner portions of the particles of the transition metal hydroxide, which serve as the precursor, to be kept low. In addition, at the particle growth stage, the pH should be decreased while keeping the solubility of the ammonia ($NH_3$) in the transition metal solution to be low. This accelerates the rate of precipitation of the transition metal hydroxide ($M1(OH)_2$) at the nucleation stage. As a result, the density of the particles of the transition metal hydroxide, which serve as the precursor, is made higher near the outer surfaces thereof than the density of the inner portions of the particles of the transition metal hydroxide.

Thus, it is possible to make the density of the transition metal hydroxide lower in the inside of the particles and higher near the outer surfaces thereof by appropriately adjusting the pH and the ammonia concentration (ammonium ion concentration) of the transition metal solution at the nucleation stage and at the particle growth stage.

Here, it is desirable that, for example, the pH of the transition metal solution be from 12 to 13 at the nucleation stage, and that the pH of the aqueous solution be from 11 to less than 12 at the particle growth stage. At this time, it is desirable that the pH of the transition metal solution at the nucleation stage be decreased by equal to or greater than 0.1, more preferably by equal to or greater than 0.2, from that at the particle growth stage. In addition, it is desirable that the ammonia concentration (ammonium ion concentration) at the particle growth stage be kept low, from 3 g/L to 10 g/L. This ensures that the rate of precipitation of the transition metal hydroxide ($M1(OH)_2$) becomes quicker at the particle growth stage than at the nucleation stage. Moreover, the density of the particles of the transition metal hydroxide is made higher near the outer surfaces thereof than density of the inner portions of the particles of the transition metal hydroxide more reliably.

It should be noted that the hollow portion 614 of the positive electrode active material particle 610 can be made larger by taking a necessary time at the nucleation stage. In addition, the shell portion 612 of the positive electrode active material particle 610 can be made thinner, by increasing the rate of precipitation of the transition metal hydroxide at the particle growth stage and also shortening the time of the particle growth stage.

Additionally, in this case, it is desirable to keep the amount of ammonia in the transition metal solution small. For example, it is desirable that the ammonium ion concentration in the transition metal solution at the nucleation stage be less than or equal to 20 g/L, and that the ammonium ion concentration in the transition metal solution at the particle growth stage be less than or equal to 10 g/L. Thus, it is possible to maintain the ion concentration of the transition metal contained in the transition metal solution to be the necessary amount, by keeping the ammonium ion concentration of the transition metal solution at the nucleation stage and at the particle growth stage. In this case, it is undesirable if the amount of ammonia is too small in the transition metal solution. It is desirable that the ammonium ion concentration in the transition metal solution at the nucleation stage and at the particle growth stage be, for example, equal to or greater than 3 g/L.

In the mixing step, a lithium compound and the transition metal hydroxide are mixed to prepare an unsintered mixture. In the sintering step, the mixture is sintered to obtain positive electrode active material particles 610. Here, the particle of the transition metal hydroxide, which serves as the precursor of the positive electrode active material particle 610, has a low density in the inner portion thereof and a high density near the outer surface thereof. As a result, in the sintering step, the particle of the transition metal hydroxide, which is the precursor, is sintered in such a manner that the inner portion thereof, which has lower density, are taken into the portion near the outer surface, which has higher density and higher mechanical strength. This enables to form a shell portion 612 of the positive electrode active material particle 610 and also to form a large hollow portion 614. Moreover, when crystals are grown at the time of sintering, a through-hole 616 penetrating through the shell portion 612 is formed in a portion of the shell portion 612. Thus, the positive electrode active material particles 610 each having the shell portion 612, the hollow portion 614, and the through-hole(s) 616 are formed, as illustrated in FIG. 9. Preferably, it is desirable to adjust the particle size of the positive electrode active material particles 610 after the sintering step by pulverizing the sintered material and sieve-classifying the pulverized material.

The thus-produced positive electrode active material particles 610 each comprise the thin shell portion 612, the wide hollow portion 614, and the through-hole(s) 616 penetrating through the shell portion 612 and spatially connecting the hollow portion 614 and the outside of the shell portion 612 of the positive electrode active material particle 610 with each other. In one preferable embodiment of such positive electrode active material particles 610, it is possible that the BET specific surface area of the positive electrode active material particles 610 be set to about 0.3 m$^2$/g to about 2.2 m$^2$/g. More preferably, the BET specific surface area of the positive electrode active material particles 610 may be set to equal to or greater than about 0.5 m$^2$/g, still more preferably equal to or greater than about 0.8 m$^2$/g. The BET specific surface area of the positive electrode active material particles 610 may also be set to, for example, less than or equal to about 1.9 m$^2$/g, more preferably less than or equal to 1.5 m$^2$/g.

In such positive electrode active material particles 610, the density of the shell portion 612 is high because the source hydroxide producing step includes the nucleation stage and the particle growth stage. Therefore, it is possible to obtain the positive electrode active material particles 610 that are harder and more morphologically stable than those obtained by other manufacturing methods (such as a spray sintering method (also referred to as a spray drying method)).

Such positive electrode active material particles 610 have an average hardness of 0.5 MPa or higher, as determined by a dynamic hardness test that is carried out, for example, using a 50 μm-diameter flat diamond indenter under the condition of a loading rate of from 0.5 mN/sec. to 3 mN/sec.

In another preferable embodiment of the active material particles disclosed herein, the average hardness of the positive electrode active material particles 610 is equal to or greater than about 0.5 MPa. The term average hardness herein refers to the values determined by a dynamic microhardness test that is carried out using a 50 μm-diameter flat diamond indenter under the condition of a loading rate of from 0.5 mN/sec. to 3 mN/sec. For this kind of dynamic microhardness test, it is possible to use, for example, a microhardness tester MCT-W500 made by Shimadzu Corp.

Thus, the positive electrode active material particles 610 have a hollow structure, as illustrated in FIG. 9, and high average hardness (in other words, high shape retention capability). Such positive electrode active material particles 610 can offer a battery that shows higher performance stably. Therefore, the positive electrode active material particles 610 are highly suitable for constructing, for example, a lithium-ion secondary battery that has low internal resistance (in other words, good output power performance) and shows low resistance increase even with charge-discharge cycles (especially with charge-discharge cycles involving discharge at high rate).

<<Lithium-Transition Metal Oxide that Constitutes the Positive Electrode Active Material Particles 610>>

In manufacturing the positive electrode active material particles 610, it is particularly desirable that the transition metal solution contain nickel. In the case where the transition metal solution contains nickel, particles of the transition metal hydroxide are produced in the form of secondary particles, in which a plurality of fine primary particles in a rice grain-like shape are aggregated, when the transition metal solution precipitates at the nucleation stage and the particle growth stage. Within the temperature range in sintering, crystals grow while almost maintaining the shape of the primary particles of the transition metal hydroxide.

It should be noted that, in the case where the transition metal solution does not contain nickel but contains cobalt and consequently particles of lithium cobalt oxide (LiCoO$_2$) are produced by sintering, the shape of the primary particles cannot be maintained, and the entire particle is sintered. When this is the case, it is difficult to obtain such positive electrode active material particles 610 each having a large hollow portion 614 (see FIG. 9) as described above.

Thus, in order to manufacture the positive electrode active material particles 610 stably, the lithium-transition metal oxide may preferably be a layered compound containing nickel as a constituent element thereof. When nickel is contained, it is possible to form particles of the transition metal hydroxide (precursor particles) in which the density of the inner portions thereof is low and the density of the portions thereof near the outer surfaces is high. Using such precursor particles in which the density of the inner portions thereof is low and the density of the portions thereof near the outer surfaces is high, it is possible to grow crystals in the sintering step while substantially keeping the shape of the primary particles. This makes it possible to manufacture the positive electrode active material particles 610 each comprise the shell portion 612, the hollow portion 614, and the through-hole(s) 616 (see FIG. 9).

In this case, it is desirable that the proportion of nickel (composition ratio) is about equal to or greater than 0.1%, more preferably equal to or greater than 0.25%, in the transition metals contained in the positive electrode active material particles 610.

In addition, the lithium-transition metal oxide may be a layered compound containing nickel, cobalt, and manganese as its constituent elements. For example, it is desirable that the lithium-transition metal oxide be a layered compound contained as $Li_{1+x}Ni_yCo_zMn_{(1-y-z)}M_\gamma O_2$. In the formula, $0 \leq x \leq 0.2$, $0.1 < y < 0.9$, $0.1 < z < 0.4$, M is an additive, and $0 \leq \gamma \leq 0.03$. For example, it is desirable that M be at least one additive selected from the group consisting of Zr, W, Mg, Ca, Na, Fe, Cr, Zn, Si, Sn, Al, B, and F. Such a lithium-transition metal oxide forms a layered compound, which can retain lithium ions in the interlayer spaces. Moreover, it is particularly suitable for manufacturing the positive electrode active material particles 610 each comprising the shell portion 612, the hollow portion 614, and the through-hole(s) 616.

Thereby, it is possible to stably obtain the positive electrode active material particles 610 in which the proportion of the hollow portion 614 in the apparent cross-sectional area of the positive electrode active material particle 610 is high, equal to or greater than 15%, preferably equal to or greater than 23%, and the thickness T of the shell portion 612 of the positive electrode active material particle 610 is thin, less than or equal to 3.0 μm, preferably less than or equal to 2.2 μm.

In this case, the hollow portion 614 of the positive electrode active material particle 610 is so large that the electrolyte solution 280 (see FIGS. 7 and 8) can be impregnated sufficiently into the hollow portion 614 of each of the positive electrode active material particles 610 in positive electrode active material layer 223. Moreover, the shell portion 612 of the positive electrode active material particle 610 is so thin that lithium ions can quickly diffuse into the inside of the shell portion 612 (i.e., the inner portion of the active material). Therefore, the lithium-ion secondary battery 100 can produce high power stably even at a low charge level.

In this case, it is desirable that the thickness of the shell portion 612 be, for example, equal to or greater than 0.05 μm, more preferably equal to or greater than 0.1 μm. When the thickness of the shell portion 612 is equal to or greater than 0.05 μm, or more preferably equal to or greater than 0.1 μm, the positive electrode active material particles 610 are allowed to have required mechanical strength. The positive electrode active material particles 610 undergo expansion and shrinkage as the release and absorption of lithium ions are repeated. Sufficient strength can be ensured against such expansion and shrinkage. Therefore, the durability of the positive electrode active material particles 610 is improved, and the performance of the lithium-ion secondary battery 100 can be made stable over a long period of time.

It is also desirable that the through-hole(s) 616 have an aperture width of equal to or greater than about 0.01 μm. Herein, the aperture width of a through-hole 616 is the length across the narrowest portion of the path in which the through-hole 616 extends from the outside of the positive electrode active material particle 610 to the hollow portion 614. When the aperture width of the through-holes 616 is 0.01 μm in average, the electrolyte solution 280 (see FIGS. 7 and 8) can sufficiently enter the hollow portion 614 from outside through the through-holes 616. This allows the advantageous effect of improving the battery performance of the lithium-ion secondary battery 100 to be obtained more appropriately.

In general, the thin shell portion 612, the wide hollow portion 614, and the through-holes 616 with wide aperture width such as in the just-mentioned positive electrode active material particles 610 cannot be achieved by other manufacturing methods (such as a spray sintering method (also referred to as a spray drying method)).

The mean value of the above-mentioned aperture width (average aperture size) can be obtained by, for example, taking at least 10 samples of the positive electrode active material particles 610, finding the aperture widths of some or all of the through holes 616 for each sample of the positive electrode active material particles 610, and obtaining the arithmetic mean value thereof. It is sufficient that the through-hole(s) 616 should be suitable for the electrolyte solution 280 to impregnate into the hollow portion 614, so it is desirable that the through-hole(s) 616 have an aperture width of less than or equal to about 2.0 μm, more preferably about 1.8 μm. In addition, it is desirable that the through-hole(s) 616 have an aperture width of equal to or greater than about 0.01 μm, more preferably equal to or greater than about 0.1 μm, in average of the positive electrode active material layer 223.

In this lithium-ion secondary battery 100, the positive electrode active material particles 610 each have the shell portion 612, the hollow portion 614, and the through-hole(s) 616, as described above. Furthermore, the present inventor proposes that the major axis length L1 of the primary particles 800 of the positive electrode active material particles 610 should be less than or equal to 0.8 μm, for example, less than or equal to 0.7 μm. The use of such positive electrode active material particles 610 can improve the output power of the lithium-ion secondary battery 100 especially in a low SOC region.

<<Control of Major Axis Length L1 of Primary Particles 800>>

As a result of assiduous studies, the present inventor discovered that the major axis length L1 of the primary particles 800 of the positive electrode active material particles 610 can be controlled by, for example, the sintering temperature and the sintering time in the above-described manufacturing method. The present inventor believes that it is appropriate to carry out the sintering at a sintering temperature of from about 750° C. to 950° C. for a sintering time of from 5 hours to 15 hours. Moreover, the major axis length L1 of the primary particles 800 of the positive electrode active material particles 610 can vary also depending on the amount of Li relative to the amount of the transition metal (Me) contained in the positive electrode active material particles 610. The present inventor suggests that the amount of Li relative to that of the transition metal (Me) be adjusted to be a mole ratio (Li/Me)=1.03 to 1.22. In this case, the mole ratio should preferably be set to equal to or greater than 1.05, for example, equal to or greater than 1.07. On the other hand, the mole ratio should preferably be set to less than or equal to 1.20, for example, less than or equal to 1.18.

<<Addition of Tungsten>>

According to the knowledge of the present inventor, it is desirable that tungsten be further added to the positive electrode active material particles 610, in order to make the major axis length L1 of the primary particles 800 of the positive electrode active material particles 610 less than or equal to about 0.8 μm.

The present inventor also discovered that, in the case where tungsten is added the positive electrode active material particles 610, the major axis length L1 of the primary particles 800 of the positive electrode active material particles 610 can be adjusted also by controlling the amount of tungsten added. Specifically, it is desirable to add 0.05 mol % to 2.0 mol % of tungsten relative to the transition metals, in order to obtain the positive electrode active material particles 610 in which the major axis length L1 of the primary particles 800 is less than or equal to 0.8 μm using the layered lithium-transition metal oxide containing nickel, cobalt, and manganese as its constituent elements as described above. It is desirable that the amount of tungsten added should be, for example, equal to or greater than 0.1 mol %, more preferably equal to or greater than 0.2 mol %, relative to the amount of the transition metals. On the other hand, the amount of tungsten added may be, for example, less than or equal to 1.5 mol %, or less than or equal to 1.0 mol %. This makes it easy to control the major axis length L1 of the primary particles 800 of the positive electrode active material particles 610.

Table 1 sets forth the test results of the major axis length L1 of the primary particles 800 of the positive electrode active material particles 610, the thickness of the shell portion 612, the particle void fraction (cross-sectional area ratio), the output power (W) at −30° C. and at 27% SOC, the high-rate cycle resistance increase rate, and the capacity retention ratio (%) after high-temperature storage, for a plurality of samples of the test battery that are varied substantially only in the positive electrode active material particles 610, the density of the positive electrode active material layer 223, and the density of the negative electrode active material layer 243.

<<Primary Particles of Lithium-transition Metal Oxide>>

Herein, the primary particles 800 (see FIG. 13) of the lithium-transition metal oxide are in such a particulate form as follows. The positive electrode active material particles 610 are secondary particles. The primary particles 800 form the positive electrode active material particles 610 as the just-mentioned secondary particles. Each of the primary particle 800 can be considered as an ultimate particle when judged from its apparent geometric shape. Note that each of the primary particles 800 is moreover an aggregate of crystallites of the lithium-transition metal oxide.

Figure 12:
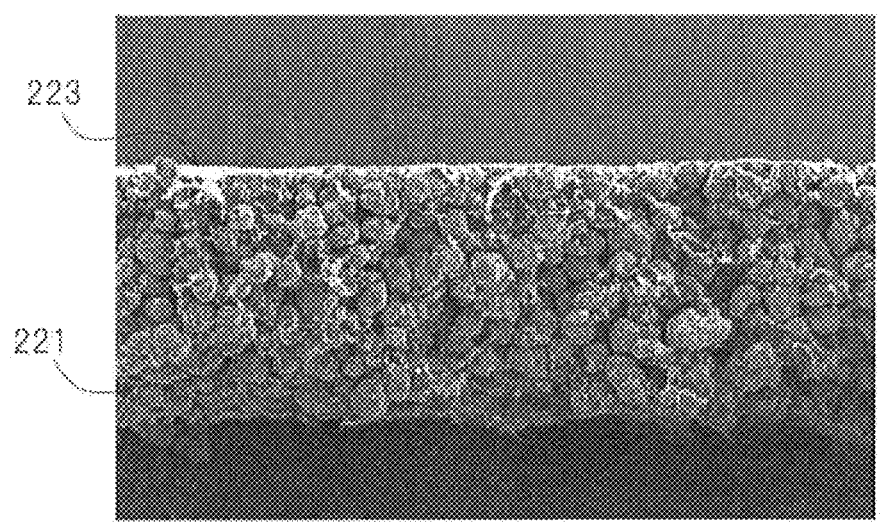
FIG. 12 is a cross-sectional SEM image showing a cross section of the positive electrode active material layer that is split by bending it.
Figure 13:
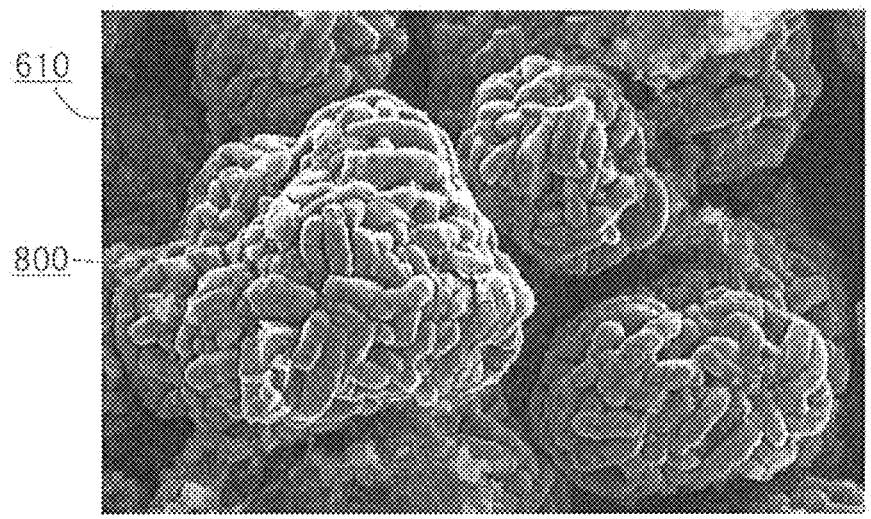
FIG. 13 is an enlarged image of the positive electrode active material particles in the SEM image of the just-mentioned cross section.

FIG. 12 is a cross-sectional SEM image showing a cross section of the positive electrode active material layer 223 that is split by bending it. FIG. 13 is an enlarged image of the positive electrode active material particles 610 in the SEM image of the just-mentioned cross section. The primary particles 800 can be observed from a SEM image of a cross section obtained by bending and splitting the positive electrode active material layer 223A, for example, as illustrated in FIGS. 12 and 13. The primary particles 800 may also be observed from an electron micrograph of the positive electrode active material particles 610, a SEM image of particle surfaces of the positive electrode active material particles 610, or the like. The SEM images of the split cross section of the positive electrode active material layer 223, the electron micrographs of the positive electrode active material particles 610, the SEM images of particle surfaces of the positive electrode active material particles 610, or the like can be obtained by, for example, a Hitachi ultra-high resolution field emission scanning electron microscope S-5500.

<<Major Axis Length L1 of Primary Particles 800>>

The major axis length L1 of the primary particles 800 can be determined based on the positive electrode active mate-

TABLE 1

| Sample | Positive electrode mixture density g/cm³ | Major axis length of primary particle μm | Thickness of shell portion μm | Particle void fraction (Cross-sectional area ratio) % | Negative electrode mixture density g/cm³ | Output power at −30° C. and at 27% SOC W | High-rate cycle resistance increase rate | Capacity retention ratio after high-temperature storage % |
|---|---|---|---|---|---|---|---|---|
| 1 | 1.91 | 0.65 | 2.19 | 23.7 | 1.13 | 118 | 1.12 | 90.8 |
| 2 | 2.03 | 0.65 | 2.19 | 23.7 | 1.13 | 121 | 1.08 | 90.9 |
| 3 | 2.29 | 0.65 | 2.19 | 23.7 | 1.13 | 125 | 1.18 | 90.8 |
| 4 | 1.92 | 0.66 | 1.07 | 36.4 | 1.13 | 123 | 1.08 | 90.8 |
| 5 | 2.01 | 0.66 | 1.07 | 36.4 | 1.13 | 125 | 1.05 | 90.9 |
| 6 | 2.11 | 0.66 | 1.07 | 36.4 | 1.13 | 131 | 1.09 | 91.0 |
| 7 | 2.24 | 0.66 | 1.07 | 36.4 | 1.13 | 134 | 1.15 | 90.9 |
| 8 | 2.12 | 0.47 | 0.51 | 53.4 | 1.13 | 135 | 1.07 | 90.9 |
| 9 | 1.92 | 0.66 | 1.07 | 36.4 | 1.02 | 116 | 1.06 | 91.1 |
| 10 | 1.92 | 0.66 | 1.07 | 36.4 | 1.21 | 126 | 1.09 | 90.1 |
| 11 | 1.73 | 0.66 | 1.07 | 36.4 | 1.13 | 110 | 1.60 | 90.7 |
| 12 | 1.82 | 0.66 | 1.07 | 36.4 | 1.13 | 118 | 1.31 | 90.8 |
| 13 | 2.42 | 0.66 | 1.07 | 36.4 | 1.13 | 139 | 1.56 | 90.8 |
| 14 | 2.54 | 0.66 | 1.07 | 36.4 | 1.13 | 142 | 1.78 | 90.7 |
| 15 | 2.63 | 0.66 | 1.07 | 36.4 | 1.13 | 143 | 2.54 | 90.7 |
| 16 | 1.92 | 0.66 | 1.07 | 36.4 | 1.42 | 129 | 1.09 | 86.7 |
| 17 | 1.92 | 0.66 | 1.07 | 36.4 | 1.54 | 131 | 1.10 | 85.4 |
| 18 | 1.92 | 0.66 | 1.07 | 36.4 | 1.63 | 133 | 1.15 | 84.3 |
| 19 | 1.92 | 0.66 | 1.07 | 36.4 | 1.76 | 135 | 1.21 | 82.1 |
| 20 | 1.92 | 0.66 | 1.07 | 36.4 | 1.86 | 136 | 1.25 | 80.2 |
| 21 | 1.81 | 0.66 | 3.03 | 3.9 | 1.12 | 65 | 1.60 | 90.6 |
| 22 | 2.04 | 0.66 | 3.03 | 3.9 | 1.12 | 87 | 1.13 | 90.7 |
| 23 | 2.23 | 0.66 | 3.03 | 3.9 | 1.12 | 105 | 1.18 | 90.6 |
| 24 | 2.43 | 0.66 | 3.03 | 3.9 | 1.12 | 118 | 1.78 | 90.6 |
| 25 | 2.65 | 0.66 | 3.03 | 3.9 | 1.12 | 128 | 2.89 | 90.7 |
| 26 | 2.87 | 0.66 | 3.03 | 3.9 | 1.12 | 134 | 3.31 | 90.7 |
| 27 | 1.93 | 0.66 | 3.03 | 3.9 | 1.01 | 56 | 1.12 | 90.9 |
| 28 | 1.93 | 0.66 | 3.03 | 3.9 | 1.23 | 89 | 1.19 | 90.0 |
| 29 | 1.93 | 0.66 | 3.03 | 3.9 | 1.43 | 110 | 1.23 | 85.4 |
| 30 | 1.93 | 0.66 | 3.03 | 3.9 | 1.65 | 118 | 1.25 | 83.8 |
| 31 | 1.93 | 0.66 | 3.03 | 3.9 | 1.87 | 125 | 1.31 | 79.1 | rial particles 610 observed from a SEM image of a cross section obtained by bending and splitting the positive electrode active material layer 223, for example, as illustrated in FIG. 13. It may also be determined based on an electron micrograph of the positive electrode active material particles 610 or a SEM image of particle surfaces of the positive electrode active material particles 610. In determining the major axis length L1 of the primary particles 800 based on a SEM image of particle surfaces of the positive electrode active material particles 610, as illustrated in FIG. 13, it is desirable that primary particles 800 that are appropriate for identifying the major axis length L1 of the primary particles 800 should be identified from the SEM image of the particle surfaces of secondary particles, the positive electrode active material particles 610.

Figure 14:
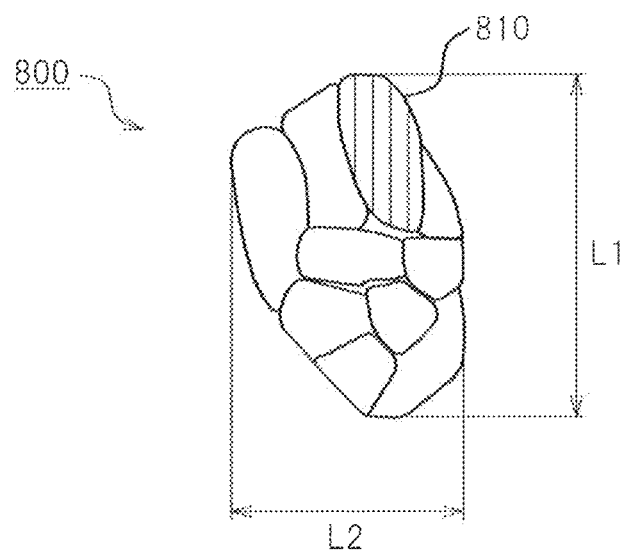
FIG. 14 is a schematic view illustrating a primary particle of the positive electrode active material particle.

More specifically, in the SEM image of the particle surfaces of the positive electrode active material particles 610, which are the secondary particles, a plurality of primary particles 800 are photographed. These primary particles 800 should be ordered in order of area, and a plurality of primary particles 800 having large areas should be extracted. This makes it possible to extract primary particles 800 whose outer shape along substantially the longest major axis length L1 are photographed from the SEM image of the particle surfaces. Then, as illustrated in FIG. 14, the length of the longest major axis is determined in the extracted primary particles 800, and the determined length is employed as the major axis length L1 of the primary particles 800. Also, the length of the minor axis that is the shortest axis orthogonal to the major axis is employed as the minor axis length L2 of the primary particles 800.

When the major axis length L1 and the minor axis length L2 of the primary particles 800 are mentioned herein about the positive electrode active material particles 610, they are evaluated as the arithmetic means thereof in a plurality of primary particles 800 contained in a single positive electrode active material particle 610. For the positive electrode active material layer 223, they are evaluated as the arithmetic means thereof in a plurality of positive electrode active material particles 610 contained in the positive electrode active material layer 223.

<<Thickness of Shell Portion>>

Herein, the thickness of the shell portion 612 refers to, as illustrated in FIG. 9, the mean value of minimum distance T(k) from an arbitrary position k within the inner surface of the shell portion 612 (note that the inner surface does not include the portion(s) thereof that corresponds to the through-hole(s) 616) to an outer surface of the shell portion 612, in a cross-sectional SEM image of the positive electrode active material or a material containing the active material particles. More specifically, it is desirable to obtain the minimum distances T(k) for a plurality of positions in the inner surface of the shell portion 612 and calculate the arithmetic mean value thereof. In this case, the greater the number of the positions at which the minimum distance T(k) is obtained, the more the thickness T of the shell portion 612 converges to the mean value, which makes it possible to evaluate the thickness of the shell portion 612 more appropriately. Usually, it is preferable that the thickness of the shell portion 612 be obtained based on at least 10 (for example, 20 or more) positive electrode active material particles 610. In addition, it is preferable that the thickness of the shell portion 612 be obtained based on the SEM images of the cross sections of at least 3 arbitrary positions (for example, 5 or more positions) in a sample (for example, in a positive electrode active material layer). Moreover, it is desirable that the thickness of the shell portion 612 of the positive electrode active material particle 610 be evaluated by, for example, an approximate average (arithmetic mean value) in the positive electrode active material layer 223. For example, it is desirable to obtain the thickness of the shell portion 612 of the positive electrode active material particle 610 based on a plurality of cross-sectional SEM images of the positive electrode active material layer 223 and to obtain the mean value (arithmetic mean value) thereof.

<<Particle Void Fraction>>

Herein, the term "particle void fraction" refers to the proportion of area occupied by the hollow portion within the apparent cross-sectional area of the positive electrode active material particle, in average of cross sections cut at random positions of a positive electrode active material. This proportion can be determined through, for example, a scanning electron microscope (SEM) image of an appropriate cross section of the positive electrode active material particles, or a material containing the active material particles. Such a cross-sectional SEM image can be obtained by, for example, cutting a sample formed by solidifying the positive electrode active material particles or a material containing the active material particles with an appropriate resin (preferably with a thermosetting resin) and observing the cross section by a SEM. In the cross-sectional SEM image, it is possible to distinguish the shell portion, the hollow portion, and the through-hole of the active material particle from each other by difference in color tone or difference in contrast. For a plurality of active material particles appearing in an arbitrary cross-sectional SEM image of the just-mentioned sample, the ratio (CV/CT) of the area CV occupied by the hollow portions of the active material particles to the apparent cross-sectional area CT occupied by the active material particles is obtained. Here, the apparent cross-sectional area CT occupied by an active material particle refers to the cross-sectional area occupied by the shell portion, the hollow portion, and the through-hole(s) of the active material particle. The proportion of the area occupied by the hollow portions within the apparent cross-sectional area of the active material particles (i.e., the particle void fraction) can be approximately obtained by the ratio (CV/CT). In this case, it is desirable that the particle void fraction be evaluated by an approximate mean value in the positive electrode active material layer 223. Thus, it is desirable to determine the particle void fraction as the mean value (arithmetic mean value) of the above-mentioned ratios (CV/CT) based on a plurality of cross-sectional SEM images of the positive electrode active material layer 223.

<<Conditioning>>

For the test battery constructed in the above-described manner, a conditioning process, measurement of rated capacity, and a SOC adjustment will be described hereinbelow in that order.

The conditioning process is carried out according to the following procedures 1 and 2.

Procedure 1: The test battery is charged with a constant current at 1 C to 4.1 V and thereafter rested for 5 minutes.

Procedure 2: After procedure 1, the test battery is charged with a constant voltage for 1.5 hours and then rested for 5 minutes.

<<Measurement of Rated Capacity>>

Next, after the above-described conditioning process, the rated capacity is measured for each of the evaluation test batteries at a temperature of 25° C. and in a voltage range of from 3.0 V to 4.1 V, through the following procedures 1 through 3.

Procedure 1: The test battery is discharged with a constant current at 1 C to 3.0 V, then discharged with a constant voltage for 2 hours, and thereafter rested for 10 seconds.

Procedure 2: The test battery is charged with a constant current at 1 C to 4.1 V, then charged with a constant voltage for 2.5 hours, and thereafter rested for 10 seconds.

Procedure 3: The battery is discharged with a constant current at 0.5 C to 3.0 V, then discharged with a constant voltage for 2 hours, and thereafter rested for 10 seconds.

Rated capacity: The discharge capacity (CCCV discharge capacity) obtained in the discharge process starting from the constant-current discharging and finishing with the constant-voltage discharging in Procedure 3 is defined as the rated capacity. In this test battery, the rated capacity is about 3.8 Ah.

<<SOC Adjustment>>

The SOC adjustment is carried out according to the following procedures 1 and 2. It is desirable to perform the SOC adjustment after the above-described conditioning process and the measurement of rated capacity. Herein, in order to make the influence of temperature uniform, the SOC adjustment is carried out in a temperature environment at a temperature of 25° C.

Procedure 1: The test battery is charged from 3 V with a constant current at 1 C so as to be in a state of charge of about 60% of the rated capacity (60% SOC).

Procedure 2: After procedure 1, the test battery is charged with a constant voltage for 2.5 hours.

This enables the test battery to be adjusted to a predetermined state of charge.

Herein, a plurality of samples of the test battery were prepared to compare several kinds of performance of the test battery.

<<Output Power Performance at −30° C. And at a SOC of 27%>>

Here, in order to evaluate the output power performance at low temperature and in a low charge level, the "output power performance at −30° C. and at a SOC of 27%" were evaluated as the performance of the test battery. The output power performance at −30° C. and at a SOC of 27% can be evaluated by the following procedures.

Procedure 1 [SOC adjustment]: As a SOC adjustment, the test battery is adjusted to a SOC of 27% (a battery voltage value of 3.553 V herein) by 1 C constant current charge in a temperature environment at room temperature (25° C. herein). Next, the test battery is charged with a constant voltage for 1 hour.

Procedure 2 [setting aside for 6 hours at −30° C.]: After procedure 1, the test battery adjusted to a SOC of 27% is set aside for 6 hours in a thermostatic chamber at −30° C.

Procedure 3 [constant wattage discharge]: After procedure 2, the test battery is discharged at a constant wattage (W) in a temperature environment of −30° C. At this time, the number of seconds from the start of the discharge until the battery voltage reaches 2.0 V is measured.

Procedure 4 [repeat]: While changing the constant wattage discharge voltage in procedure 3 within the range of 80 W to 200 W, the foregoing procedures 1 through 3 are repeated. Here, the foregoing procedures 1 through 3 are repeated while increasing the constant wattage discharge voltage in procedure 3 by 10 W at every time, e.g., 80 W at the first time, 90 W at the second time, 100 W at the third time, . . . and so forth, until the constant wattage discharge voltage reaches 200 W. Herein, the constant wattage discharge voltage in procedure 3 is increased by 10 W for each time. In addition to this, the constant wattage discharge voltage in procedure 3 may be increased by a certain wattage for each time (for example, by 5 W for each time, or by 15 W for each time). It is also possible to decrease the constant wattage discharge voltage by a certain wattage for each time (for example, by 5 W for each time, by 10 W for each time, or by 15 W for each time).

Figure 15:
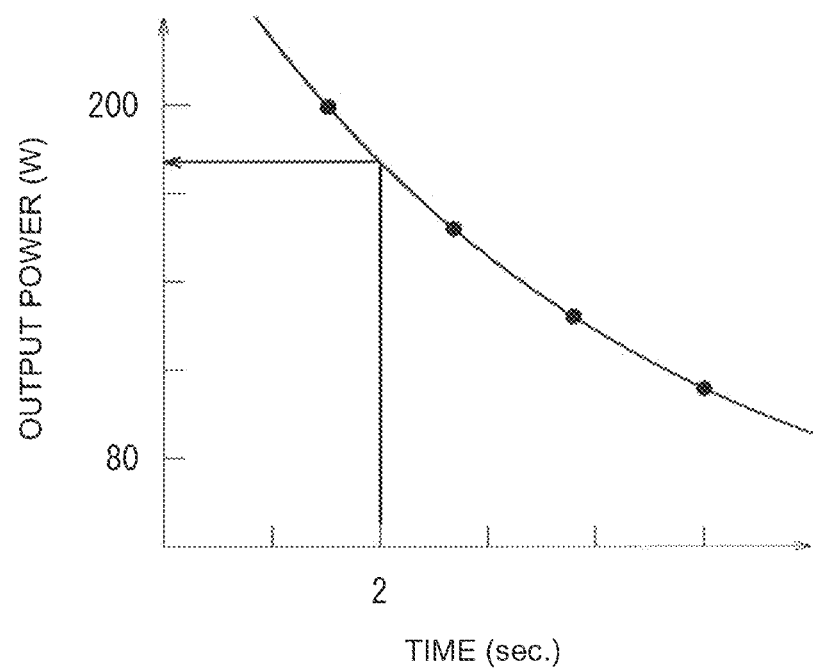
FIG. 15 is a graph illustrating a fitted curve for calculating output power (W) at −30° C. and 27% SOC.

Procedure 5 [calculation of output power performance]: For example, as illustrated in FIG. 15, the number of seconds it takes to reach 2.0 V, which is measured under the constant wattage condition in Procedure 4, is plotted along the horizontal axis, and the wattage (W) at that time is plotted along the vertical axis. Then, from the approximated curve of the plots, the wattage (W) at 2 seconds is calculated as the "output power at −30° C. and at 27% SOC".

Such output power performance indicates the output power that the test battery can provide in the case where the battery is set aside at a low charge level of about 27% SOC and in an extremely low temperature environment of −30° C. Accordingly, the output power performance 1 shows that the higher the wattage (W) is, the higher output power the test battery can produce. Moreover, the output power performance 1 also shows that the higher the wattage (W) is, the more stable output power the test battery can obtain even at a low charge level of about 27% SOC.

<<High-rate Cycle Resistance Increase Rate>>

Next, the resistance increase rate after predetermined charge-discharge cycling was evaluated for each of such test cells. Herein, after subjecting the test cells to the above-described conditioning, the I-V resistance is measured for each of the test cells in a temperature environment at 25° C. The obtained value is defined as "initial resistance". Next, predetermined charge-discharge cycles are carried out for the test cells in a temperature environment at −15° C., and the I-V resistance is measured in a temperature environment at 25° C. as with the initial resistance. The obtained value is defined as "post-cycling resistance". The value "resistance increase rate after charge-discharge cycling" is an evaluation value for evaluating how much the "post-cycling resistance" has increased relative to "initial resistance", which is the value obtained by "post-cycling resistance"/"initial resistance".

<<Charge-discharge Cycle>>

Figure 16:
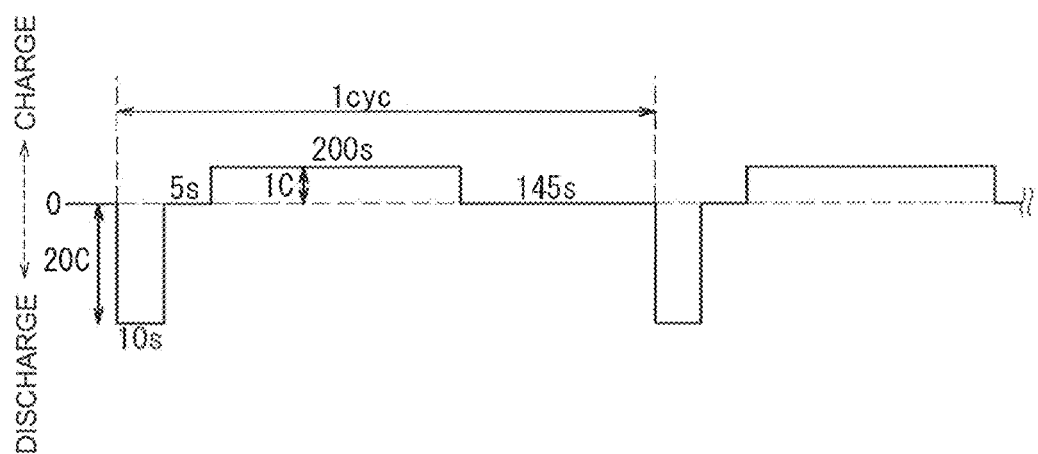
FIG. 16 is a chart illustrating a charge-discharge cycle in a test for evaluating high-rate cycle resistance increase rate.

Here, FIG. 16 shows a charge-discharge cycle in the performance evaluation test.

The following describes one cycle of the charge-discharge cycle, which comprises the following procedures (I) through (V).

(I) The test cell is discharged with a constant current of 20 C (4.4 A herein) for 10 seconds.

(II) The test cell is rested for 5 seconds.

(III) The test cell is charged with a constant current of 1 C for 200 seconds.

(IV) The test cell is rested for 145 seconds.

(V) The resistance increase rate of the test cell in the discharging of the procedure (I) is measured at every cycle.

Every time the one charge-discharge cycle comprising the just-described procedures (I) through (V) is repeated 100 times, the test cell is adjusted to 60% SOC in the manner described in the SOC adjustment above.

<<I-V Resistance Measurement>>

At this point, the initial resistance before the charge-discharge cycles and the post-cycling resistance after the charge-discharge cycles are measured. The resistance was evaluated by I-V resistance. The I-V resistance is measured in the following manner. Each of the test cells is adjusted to 60% SOC in a temperature environment at 25° C. After having been rested for 10 minutes, each of the test cells was discharged with a constant current of 30 C for 10 seconds (CC-discharging). Here, the end-of-discharge voltage was set at 3.0 V. At this time, the gradient V=IR (R=VI) was employed as the I-V resistance.

<<Capacity Retention Ratio (%) after High-temperature Storage>>

The capacity retention ratio (post-storage capacity retention ratio) can be obtained in the following manner. A test cell adjusted to a predetermined state of charge is stored in a predetermined environment for a predetermined time, and thereafter the discharge capacity thereof (hereinafter referred to as "post-storage capacity" as appropriate) is determined under the same conditions as those in which the initial capacity was measured. Then, the capacity retention ratio (post-storage capacity retention ratio) is obtained as the ratio (post-storage capacity)/(initial capacity). Herein, the "post-storage capacity" is the discharge capacity that is measured based on a test cell that is adjusted to 90% SOC and thereafter stored in a temperature environment at 60° C. for 30 days.

Post-storage capacity retention ratio=(Post-storage capacity)/(Initial capacity)×100(%)

For example, samples 1 to 10 show a particle void fraction of 15% or greater, which indicates that they have a hollow portion having a large space. In addition, the density A of the positive electrode active material layer 223 thereof is: 1.80 g/cm³≤A≤2.35 g/cm³, and the density B of the negative electrode active material layer 243 thereof is: 0.95 g/cm³≤B≤1.25 g/cm³. In this case, considerably high output power can be obtained in terms of output power (W) at −30° C. and at 27% SOC. In addition, the high-rate cycle resistance increase rate can be kept low, about 1.20 or less. Moreover, the capacity retention ratio (%) after high-temperature storage can be maintained at about 90%.

On the other hand, sample 11, for example, has a density A of the positive electrode active material layer 223 of less than 1.75 g/cm³, and in particular, the high-rate cycle resistance increase rate thereof tends to be high, about 1.60. Sample 12 has a density A of the positive electrode active material layer 223 of equal to or greater than 1.80 g/cm³, and the high-rate cycle resistance increase rate is about 1.31, which means that the increase is lessened.

On the other hand, samples 13 to 15, for example, have a density A of the positive electrode active material layer 223 of 2.42 g/cm³ or higher, and in particular, their high-rate cycle resistance increase rates tend to be higher than about 1.55. As indicated by samples 13 to 15, in the cases where the density A of the positive electrode active material layer 223 is equal to or higher than 2.42 g/cm³, the higher the density A of the positive electrode active material layer 223 is, particularly the higher the high-rate cycle resistance increase rate tends to be.

As indicated by samples 16 to 20, in the cases where the density B of the negative electrode active material layer is higher than 1.42 g/cm³, the capacity retention ratio (%) after high-temperature storage results in about 87% or less, which means that the capacity retention ratio tends to deteriorate. In this case, as indicated by samples 16 to 20, the higher the density B of the negative electrode active material layer 243 is, the lower the capacity retention ratio (%) after high-temperature storage tends to be.

In samples 21 to 31, the particle void fraction of the positive electrode active material particles 610 thereof is about 4%, which means that they employ so-called solid positive electrode active material particles. In this case, it is difficult to obtain satisfactory performance for all of the output power (W) at −30° C. and at 27% SOC, the high-rate cycle resistance increase rate, and the capacity retention ratio (%) after high-temperature storage.

Samples 21 to 23 and 27 to 29, for example, tend to be poor in terms of the output power (W) at −30° C. and at 27% SOC. In samples 24 to 26, the high-rate cycle resistance increase rate tends to be high. In samples 29 to 31, the high-rate cycle resistance increase rate tends to be high, and in addition, the capacity retention ratio (%) after high-temperature storage tends to be low. Thus, when the particle void fraction indicates so-called solid positive electrode active material particles, sufficient performance may not be obtained in terms of the output power (W) at −30° C. and at 27% SOC, the high-rate cycle resistance increase rate, or the capacity retention ratio (%) after high-temperature storage.

Accordingly, it is desirable to employ the positive electrode active material particles having a perforated hollow structure for the positive electrode active material particles 610. It is desirable that the density A of the positive electrode active material layer 223 be approximately 1.80 g/cm³≤A, more preferably approximately 1.80 g/cm³≤A. It is also desirable that the density A of the positive electrode active material layer 223 be approximately A≤2.35 g/cm³, more preferably approximately A≤2.30 g/cm³. Moreover, it is desirable that the density B of the negative electrode active material layer 243 be approximately 0.95 g/cm³≤B, more preferably approximately 1.00 g/cm³≤B, still more preferably approximately 1.10 g/cm³≤B. It is also desirable that the density B of the negative electrode material layer 243 be approximately 1.25 g/cm³≤B, more preferably approximately 1.22 g/cm³≤B.

Thus, it becomes possible to provide a lithium-ion secondary battery 100 that can obtain considerably high output power in terms of output power (W) at −30° C. and at 27% SOC, that can offer a low high-rate cycle resistance increase rate of less than or equal to 1.20, and that can maintain a capacity retention ratio after high-temperature storage of about equal to or greater than 90%.

In this case, it is particularly preferable that the positive electrode active material particles have a particle void fraction of equal to or greater than 15% in average of the positive electrode active material layer. It is also possible that, when the thickness of the shell portion at an arbitrary position within an inner surface of the shell portion is defined by the minimum distance from the arbitrary position within the inner surface of the shell portion to an outer surface of the shell portion in an arbitrary cross section of the positive electrode active material layer, the thickness of the shell portion may be less than or equal to 3.0 μm in average of the positive electrode active material layer. It is also possible that the thickness of the shell portion may be equal to or greater than 0.1 μm. In addition, the primary particles of the lithium-transition metal oxide may have a major axis length of less than or equal to 0.8 μm in average of the positive electrode active material layer. In this case, the major axis length of the primary particles of the lithium-transition metal oxide may be equal to or greater than 0.2 μm. The through-hole may have an aperture width of from 0.01 μm to 2.0 μm in average of the positive electrode active material layer.

As a result, the performance of the lithium-ion secondary battery can be more stabilized in terms of considerably high output power at −30° C. and at 27% SOC, high-rate cycle resistance increase rate, and capacity retention ratio (%) after high-temperature storage.

In this case, the lithium-transition metal oxide may contain at least one metal element selected from the group consisting of Ni, Co, and Mn. It is also possible that the lithium-transition metal oxide may contain Ni, Co, and Mn. In one preferable embodiment, the lithium-transition metal oxide may be $Li_{1+x}Ni_yCo_zMn_{(1-y-z)}M_\gamma O_2$. In the formula, $0 \leq x \leq 0.2$, $0.1 < y < 0.9$, $0.1 < z < 0.4$, and $0 \leq \gamma \leq 0.03$. M is at least one additive selected from the group consisting of Zr, W, Mg, Ca, Na, Fe, Cr, Zn, Si, Sn, Al, B, and F. In this case, it is desirable that the lithium-transition metal oxide may contain W, and the W content $m_{MA}$ may be from 0.05 mole % to 2 mole % when the total number $m_{MT}$ of moles of Ni, Co, and Mn is set at 100 mole % expressed in mole percentage.

It is also possible, for example, that the positive electrode active material layer may further comprise a conductive agent and PVDF in addition to the positive electrode active material particles, and that the positive electrode active material particles may be contained in an amount of from 86 mass % to 94 mass %, the conductive agent may be contained in an amount of from 6 mass % to 10 mass %, and the PVDF may be contained in an amount of from 1 mass % to 4 mass %. The negative electrode active material layer may contain the negative electrode active material particles, for example, in an amount of from 97 mass % to 99 mass %.

It is desirable, as described earlier, that the positive electrode active material particles be manufactured by a method comprising the steps of: producing a source hydroxide by supplying ammonium ions to an aqueous solution of a transition metal compound to precipitate particles of a transition metal hydroxide from the aqueous solution, the aqueous solution containing at least one of the transition metal elements constituting a lithium-transition metal oxide; mixing the transition metal hydroxide with a lithium compound to prepare an unsintered mixture; and sintering the mixture to obtain the active material particles. This makes it possible to obtain positive electrode active material particles having a perforated hollow structure in a stable manner.

Hereinabove, the lithium-ion secondary battery 100 according to one embodiment of the present invention has been described, but the lithium-ion secondary battery 100 according to one embodiment of the present invention is not particularly limited by any of the foregoing embodiments.

As described above, the lithium-ion secondary battery according to the embodiments of the present invention contributes to performance improvements in output power (W) at −30° C. and at 27% SOC, high-rate cycle resistance increase rate, and capacity retention ratio (%) after high-temperature storage. Therefore, the lithium-ion secondary battery according to one embodiment of the present invention is suitable for secondary batteries for vehicle-driving power sources that require high capacity and high power, such as batteries for driving hybrid vehicles, which require high levels of the just-mentioned characteristics, and further, batteries for driving plug-in hybrid vehicles and electric vehicles, which require a particularly high level of capacity.

Figure 17:
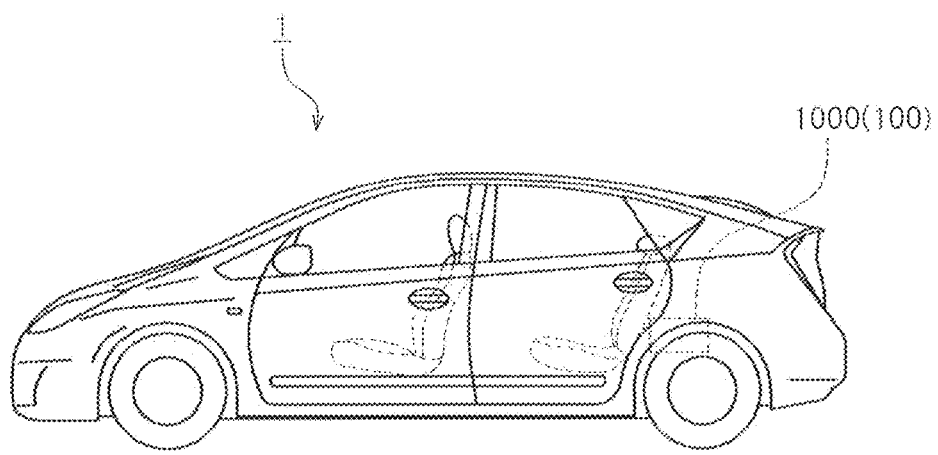
FIG. 17 is a view illustrating an example of a vehicle incorporating a vehicle drive battery.

In this case, as illustrated in FIG. 17, for example, the present invention can be suitably utilized in the form of a battery module, in which a plurality of secondary batteries are connected and combined, for a vehicle drive battery 1000 for driving a motor (electric motor) of a vehicle 1 such as an automobile. In particular, the lithium-ion secondary battery according to one embodiment of the present invention can produce high power stably even at a low charge level, so it can withstand the use at a lower charge level. Therefore, the battery can be used efficiently, and at the same time, even when a high level of capacity is demanded, the number of required batteries can be reduced, resulting in a low cost. Moreover, the lithium-ion secondary battery according to one embodiment of the present invention can produce high output power even in a low temperature environment. Thus, the lithium-ion secondary battery 100 according to one embodiment of the present invention is particularly suitable as a vehicle drive battery 1000.

REFERENCE SIGNS LIST

1—Vehicle
10—Lithium-ion secondary battery
200—Wound electrode assembly
220—Positive electrode sheet
221—Positive electrode current collector
222—Uncoated portion
223—Positive electrode active material layer
240—Negative electrode sheet
241—Negative electrode current collector
242—Uncoated portion
243—Negative electrode active material layer
262, 264—Separator
280—Electrolyte solution
290—Charger
300—Battery case
310—Gap
320—Case main body
340—Lid
350—Filling port
352—Sealing cap
360—Safety vent
420—Electrode terminal
440—Electrode terminal
610—Positive electrode active material particle
612—Shell portion
614—Hollow portion
616—Through-hole
620—Conductive agent
630—Binder
710—Negative electrode active material particle
730—Binder
800—Primary particle of the positive electrode active material particle 610
1000—Vehicle drive battery

The invention claimed is:

1. A lithium-ion secondary battery comprising:
a positive electrode current collector;
a positive electrode active material layer retained on the positive electrode current collector and containing positive electrode active material particles;
a negative electrode current collector; and
a negative electrode active material layer retained on the negative electrode current collector and containing negative electrode active material particles comprising a graphite material,
the positive electrode active material particles being in the form of secondary particles in which a plurality of primary particles having an elongated shape are aggregated;
the positive electrode active material particles being perforated hollow particles each comprising:
a shell portion comprising a layered lithium-transition metal oxide;
a hollow portion formed inside the shell portion; and
a through-hole penetrating through the shell portion, wherein:
the proportion of the hollow portion is equal to or greater than 20% of the apparent cross-sectional area of the positive electrode active material particle,
the positive electrode active material layer has a density A of 1.80 g/cm$^3$≤A≤2.35 g/cm$^3$; and
the negative electrode active material layer has a density B of 0.95 g/cm$^3$≤B≤1.25g/cm$^3$.

2. The lithium-ion secondary battery according to claim 1, wherein, when the thickness of the shell portion at an arbitrary position within an inner surface of the shell portion is defined by the minimum distance from the arbitrary position within the inner surface of the shell portion to an outer surface of the shell portion in an arbitrary cross section of the positive electrode active material layer, the thickness of the shell portion is less than or equal to 3.0 µm in average of the positive electrode active material layer.

3. The lithium-ion secondary battery according to claim 1, wherein the thickness of the shell portion is equal to or greater than 0.1 µm.

4. The lithium-ion secondary battery according to claim 1, wherein the primary particles have a major axis length of less than or equal to 0.8 µm in average of the positive electrode active material layer.

5. The lithium-ion secondary battery according to claim 4, wherein the primary particles have a major axis length of equal to or greater than 0.2 µm.

6. The lithium-ion secondary battery according to claim 1, wherein the through-hole has an aperture width of from 0.01 µm to 2.0 µm in average of the positive electrode active material layer.

7. The lithium-ion secondary battery according to claim 1, wherein the lithium-transition metal oxide contains at least one metal element selected from the group consisting of Ni, Co, and Mn.

8. The lithium-ion secondary battery according to claim 1, wherein the lithium-transition metal oxide contains Ni, Co, and Mn.

9. The lithium-ion secondary battery according to claim 8, wherein:
the lithium-transition metal oxide is $Li_{1+x}Ni_yCo_zMn_{(1-y-z)}M_\gamma O_2$, where:
0≤x≤0.2, 0.1<y<0.9, 0.1<z<0.4, and 0≤γ≤0.03; and
M is at least one additive selected from the group consisting of Zr, W, Mg, Ca, Na, Fe, Cr, Zn, Si, Sn, Al, B, and F.

10. The lithium-ion secondary battery according to claim 7, wherein the lithium-transition metal oxide contains W, and the W content $m_{MA}$ is from 0.05 mole % to 2 mole % when the total number $m_{MT}$ of moles of Ni, Co, and Mn is set at 100 mole % expressed in mole percentage.

11. The lithium-ion secondary battery according to claim 1, wherein: the positive electrode active material layer further comprises a conductive agent and PVDF in addition to the positive electrode active material particles; and the positive electrode active material particles is contained in an amount of from 86 mass % to 94 mass %, the conductive agent is contained in an amount of from 6 mass % to 10 mass %, and the PVDF is contained in an amount of from 1 mass % to 4 mass %.

12. The lithium-ion secondary battery according to claim 1, wherein the negative electrode active material layer contains the negative electrode active material particles in an amount of from 97 mass % to 99 mass %.

13. The lithium-ion secondary battery according to claim 1, wherein the positive electrode active material particles are manufactured by a method comprising the steps of:
producing a source hydroxide by supplying ammonium ions to an aqueous solution of a transition metal compound to precipitate particles of a transition metal hydroxide from the aqueous solution, the aqueous solution containing at least one of the transition metal elements constituting the lithium-transition metal oxide;
mixing the transition metal hydroxide with a lithium compound to prepare an unsintered mixture; and
sintering the mixture to obtain the active material particles.

* * * * *